US012606325B2

(12) United States Patent
Miller

(10) Patent No.: US 12,606,325 B2
(45) Date of Patent: *Apr. 21, 2026

(54) UNMANNED AERIAL VEHICLE (UAV) FOR FACILITATING AERIAL DELIVERIES OF CARGO

(71) Applicant: Airhive Inc, Las Vegas, NV (US)

(72) Inventor: Kenneth Jerome Miller, Miami, FL (US)

(73) Assignee: Airhive Inc., Las Vegas, NV (US)

( * ) Notice: Subject to any disclaimer, the term of this patent is extended or adjusted under 35 U.S.C. 154(b) by 104 days.

This patent is subject to a terminal disclaimer.

(21) Appl. No.: 18/640,016

(22) Filed: Apr. 19, 2024

(65) Prior Publication Data

US 2025/0368359 A1 Dec. 4, 2025

(30) Foreign Application Priority Data

May 9, 2023 (WO) ................ PCT/US2023/021605

(51) Int. Cl.
*B64U 10/14* (2023.01)
*B64U 50/19* (2023.01)
*B64U 101/64* (2023.01)

(52) U.S. Cl.
CPC ............. *B64U 10/14* (2023.01); *B64U 50/19* (2023.01); *B64U 2101/64* (2023.01)

(58) Field of Classification Search
CPC ..... B64U 10/14; B64U 50/19; B64U 2101/64
See application file for complete search history.

(56) References Cited

U.S. PATENT DOCUMENTS

| | | | | | |
|---|---|---|---|---|---|
| 1,193,556 | A | * | 8/1916 | Kemps ..................... | A44B 9/10 24/707.6 |
| 2,451,244 | A | * | 10/1948 | Rugg ....................... | B64D 3/00 33/300 |
| 2,453,857 | A | * | 11/1948 | Platt .......................... | B64F 1/04 244/154 |
| 3,064,252 | A | * | 11/1962 | Varela ...................... | G01S 1/02 342/123 |
| 4,500,056 | A | * | 2/1985 | Della-Moretta ... | B62D 53/0864 244/137.4 |
| 4,766,548 | A | * | 8/1988 | Cedrone ................. | G07F 9/026 221/9 |

(Continued)

*Primary Examiner* — Medhat Badawi
(74) *Attorney, Agent, or Firm* — Dhiraj Jindal; PATENT YOGI LLC

(57) ABSTRACT

Disclosed herein is an unmanned aerial vehicle (UAV) for facilitating aerial deliveries of cargo. Accordingly, the UAV may include a body defining a receptacle with a receptacle opening within the body. Further, the UAV may include a propulsion assembly attached to the body. Further, the UAV may include a compartment defining element. Further, the compartment defining element may be configured for defining at least one compartment in the receptacle. Further, each of the at least one compartment may include a compartment interior space and a compartment opening leading into the compartment interior space. Further, the UAV may include a lid coupled to the body. Further, the UAV may include a locking device coupled to the lid. Further, each of the locking device may be configured to be transitioned from a locked state to an unlocked state based on a code.

20 Claims, 15 Drawing Sheets

(56) References Cited

U.S. PATENT DOCUMENTS

| | | | | |
|---|---|---|---|---|
| 4,952,911 | A * | 8/1990 | D'Ambrosia | G01S 17/04 340/556 |
| 5,128,861 | A * | 7/1992 | Kagami | G06Q 10/087 705/28 |
| 5,179,843 | A * | 1/1993 | Cohausz | F25D 25/00 62/239 |
| 5,207,784 | A * | 5/1993 | Schwartzendruber | G07F 9/026 221/6 |
| 5,338,199 | A * | 8/1994 | Euer | F41J 9/10 434/14 |
| 5,636,122 | A * | 6/1997 | Shah | G08G 1/127 701/454 |
| 5,844,808 | A * | 12/1998 | Konsmo | G07F 9/026 379/93.31 |
| 5,877,688 | A * | 3/1999 | Morinaka | G06V 40/10 374/45 |
| D411,814 | S * | 7/1999 | Chibuka | D12/90 |
| 5,922,040 | A * | 7/1999 | Prabhakaran | G08G 1/127 701/532 |
| 6,021,394 | A * | 2/2000 | Takahashi | G06Q 30/0202 235/375 |
| 6,034,803 | A * | 3/2000 | Sullivan | G01S 17/42 356/601 |
| 6,181,981 | B1 * | 1/2001 | Varga | G07F 9/026 700/244 |
| 6,230,150 | B1 * | 5/2001 | Walker | G06Q 40/12 700/238 |
| 6,323,941 | B1 * | 11/2001 | Evans | G01S 17/86 356/141.5 |
| 6,571,150 | B2 * | 5/2003 | Arai | G07F 5/18 700/241 |
| 6,609,101 | B1 * | 8/2003 | Landvater | G06Q 30/0202 705/7.31 |
| 6,636,598 | B1 * | 10/2003 | Thomson | H04M 3/5232 379/266.08 |
| 7,030,968 | B2 * | 4/2006 | D'Aligny | G01B 11/24 356/139.1 |
| 7,051,539 | B2 * | 5/2006 | Junge | F25D 17/045 62/90 |
| 7,139,721 | B2 * | 11/2006 | Borders | G06Q 10/08 705/7.33 |
| 7,149,611 | B2 * | 12/2006 | Beck | B64U 30/26 701/32.4 |
| 7,177,825 | B1 * | 2/2007 | Borders | G06Q 30/016 705/28 |
| 7,190,465 | B2 * | 3/2007 | Froehlich | G01S 7/4811 356/601 |
| 7,227,116 | B2 * | 6/2007 | Gleckler | G01N 21/6408 250/214 VT |
| 7,263,939 | B1 * | 9/2007 | Phillips | B63H 9/072 114/102.16 |
| 7,281,891 | B2 * | 10/2007 | Smith | F03D 7/024 416/61 |
| 7,521,935 | B2 * | 4/2009 | Uchida | G01R 31/3842 324/426 |
| D615,905 | S * | 5/2010 | Arnell | D12/91 |
| 7,798,885 | B2 * | 9/2010 | Wong | A63H 33/3016 446/139 |
| 7,944,548 | B2 * | 5/2011 | Eaton | G01C 11/025 356/5.07 |
| 8,072,581 | B1 * | 12/2011 | Breiholz | G01S 17/89 356/5.01 |
| 8,191,779 | B2 * | 6/2012 | Illingworth | G06Q 30/0619 700/231 |
| 8,326,707 | B2 * | 12/2012 | Fan | G06Q 10/087 235/382 |
| 8,630,897 | B1 * | 1/2014 | Prada Gomez | G08G 1/202 705/14.57 |
| 8,675,184 | B2 * | 3/2014 | Schmitt | G01S 17/95 356/28 |
| 8,788,341 | B1 * | 7/2014 | Patel | G07F 9/001 700/231 |
| 8,836,922 | B1 * | 9/2014 | Pennecot | G01S 17/42 356/9 |
| 8,862,388 | B2 * | 10/2014 | Wu | H02J 7/0013 701/425 |
| 8,989,053 | B1 * | 3/2015 | Skaaksrud | H04W 4/80 370/255 |
| D734,211 | S * | 7/2015 | Ahn | D12/86 |
| 9,086,273 | B1 * | 7/2015 | Gruver | G01S 17/42 |
| 9,147,192 | B2 * | 9/2015 | Dawson | G06Q 30/0269 |
| 9,230,236 | B2 * | 1/2016 | Villamar | G06Q 10/087 |
| 9,256,852 | B1 * | 2/2016 | Myllymaki | B60P 3/007 |
| 9,307,383 | B1 * | 4/2016 | Patrick | B64U 30/299 |
| D755,673 | S * | 5/2016 | Ahn | D12/86 |
| 9,383,753 | B1 * | 7/2016 | Templeton | G05D 1/0246 |
| 9,488,984 | B1 * | 11/2016 | Williams | G06V 10/145 |
| 9,489,490 | B1 * | 11/2016 | Theobald | G16H 20/13 |
| 9,552,564 | B1 * | 1/2017 | Martenis | G07C 9/00571 |
| 9,613,346 | B2 * | 4/2017 | Crow | G06Q 20/18 |
| 9,684,914 | B1 * | 6/2017 | Porter | G06Q 30/0611 |
| 9,688,404 | B1 * | 6/2017 | Buchmueller | G05D 1/00 |
| 9,741,010 | B1 * | 8/2017 | Heinla | G06Q 10/083 |
| 9,786,187 | B1 * | 10/2017 | Bar-Zeev | G06Q 10/08355 |
| 9,815,633 | B1 * | 11/2017 | Kisser | B65G 37/02 |
| 9,824,394 | B1 * | 11/2017 | Boates | G06Q 40/03 |
| 9,905,133 | B1 * | 2/2018 | Kumar | G07C 5/008 |
| 9,984,525 | B2 * | 5/2018 | Will | G07F 11/44 |
| 10,028,606 | B1 * | 7/2018 | Ritchie | A47G 29/12 |
| 10,029,787 | B1 * | 7/2018 | Lesser | G06Q 10/0833 |
| 10,120,384 | B2 * | 11/2018 | Wilkinson | G06V 20/58 |
| 10,308,430 | B1 * | 6/2019 | Brady | G06Q 10/083 |
| 10,399,704 | B2 * | 9/2019 | Briggs, IV | B66D 1/505 |
| 11,254,446 | B2 * | 2/2022 | Ratajczak | B66F 19/00 |
| 11,440,880 | B2 * | 9/2022 | Greig | C07D 209/46 |
| 2002/0023594 | A1 * | 2/2002 | Greene, Jr. | A01K 1/0245 119/496 |
| 2003/0209375 | A1 * | 11/2003 | Suzuki | B60L 58/25 180/68.5 |
| 2004/0181570 | A1 * | 9/2004 | Kaneko | G06Q 10/0832 709/200 |
| 2004/0225954 | A1 * | 11/2004 | Maloney | G08B 13/1427 715/255 |
| 2005/0017129 | A1 * | 1/2005 | McDonnell | B64U 70/70 244/110 G |
| 2005/0043011 | A1 * | 2/2005 | Murray | H04W 68/00 455/403 |
| 2005/0060246 | A1 * | 3/2005 | Lastinger | G06Q 10/087 705/28 |
| 2006/0106490 | A1 * | 5/2006 | Howell | G07F 9/006 700/233 |
| 2007/0182818 | A1 * | 8/2007 | Buehler | G08B 13/19608 348/143 |
| 2007/0235465 | A1 * | 10/2007 | Walker | G07F 9/001 221/9 |
| 2008/0108273 | A1 * | 5/2008 | Alden | G09F 19/08 446/34 |
| 2010/0036717 | A1 * | 2/2010 | Trest | G06Q 30/0251 705/14.1 |
| 2010/0219953 | A1 * | 9/2010 | Bloy | G01S 13/872 705/28 |
| 2010/0228405 | A1 * | 9/2010 | Morgal | B62H 3/00 701/1 |
| 2010/0234991 | A1 * | 9/2010 | Zini | G06K 19/0723 700/248 |
| 2010/0301056 | A1 * | 12/2010 | Wolfe | B65D 81/3813 220/592.01 |
| 2011/0130134 | A1 * | 6/2011 | Van Rysselberghe | A47G 29/141 455/422.1 |
| 2011/0313811 | A1 * | 12/2011 | Urban | G06Q 20/203 296/24.3 |
| 2012/0059729 | A1 * | 3/2012 | Roa | G06Q 30/0601 705/26.1 |
| 2012/0078553 | A1 * | 3/2012 | Kuroda | B60L 53/11 702/63 |
| 2012/0173747 | A1 * | 7/2012 | Roesch | G06Q 10/063 709/231 |

(56) References Cited

U.S. PATENT DOCUMENTS

| | | | | |
|---|---|---|---|---|
| 2012/0185130 A1* | 7/2012 | Ekchian | B60Q 1/444 | 701/36 |
| 2013/0043450 A1* | 2/2013 | Kommer | B66D 3/10 | 254/391 |
| 2013/0061044 A1* | 3/2013 | Pinkus | G07C 5/08 | 713/160 |
| 2013/0233964 A1* | 9/2013 | Woodworth | B64U 10/60 | 244/175 |
| 2013/0282472 A1* | 10/2013 | Penilla | B60L 53/80 | 705/14.1 |
| 2013/0307698 A1* | 11/2013 | Park | F25D 29/00 | 340/815.4 |
| 2014/0022051 A1* | 1/2014 | Levien | G05D 1/0011 | 340/5.2 |
| 2014/0136414 A1* | 5/2014 | Abhyanker | G06Q 20/3224 | 701/25 |
| 2014/0209634 A1* | 7/2014 | Metropulos | B67D 1/0041 | 222/608 |
| 2014/0316561 A1* | 10/2014 | Tkachenko | G07F 11/02 | 700/236 |
| 2014/0330739 A1* | 11/2014 | Falcone | G06Q 10/08355 | 705/338 |
| 2014/0344608 A1* | 11/2014 | Wang | G06F 1/3287 | 713/324 |
| 2014/0358353 A1* | 12/2014 | Ibanez-Guzman | G05D 1/0297 | 701/23 |
| 2014/0380264 A1* | 12/2014 | Misra | H04L 67/12 | 717/100 |
| 2015/0006005 A1* | 1/2015 | Yu | G05D 1/667 | 701/22 |
| 2015/0120094 A1* | 4/2015 | Kimchi | B64U 10/14 | 701/3 |
| 2015/0134546 A1* | 5/2015 | Penilla | G06Q 10/20 | 705/305 |
| 2015/0149015 A1* | 5/2015 | Nakano | B60L 58/12 | 701/22 |
| 2015/0153175 A1* | 6/2015 | Skaaksrud | G08B 21/0261 | 701/23 |
| 2015/0170099 A1* | 6/2015 | Beach-Drummond | G06Q 10/08355 | 705/26.81 |
| 2015/0348112 A1* | 12/2015 | Ramanujam | G06Q 30/0266 | 705/14.63 |
| 2016/0018224 A1* | 1/2016 | Isler | G06Q 10/047 | 701/25 |
| 2016/0033966 A1* | 2/2016 | Farris | G01C 21/20 | 701/16 |
| 2016/0062583 A1* | 3/2016 | Ricci | G08G 1/096775 | 715/746 |
| 2016/0071052 A1* | 3/2016 | Henry | H04B 5/77 | 235/380 |
| 2016/0083115 A1* | 3/2016 | Hess | B64F 3/02 | 701/3 |
| 2016/0098871 A1* | 4/2016 | Oz | G01S 19/42 | 340/5.61 |
| 2016/0247109 A1* | 8/2016 | Scicluna | G06Q 50/40 | |
| 2016/0286627 A1* | 9/2016 | Chen | G06Q 50/26 | |
| 2016/0300187 A1* | 10/2016 | Kashi | G06Q 10/0832 | |
| 2016/0334797 A1* | 11/2016 | Ross | G05D 1/0027 | |
| 2016/0357187 A1* | 12/2016 | Ansari | G08G 1/165 | |
| 2016/0357188 A1* | 12/2016 | Ansari | G05D 1/0274 | |
| 2016/0358477 A1* | 12/2016 | Ansari | B60W 60/0059 | |
| 2016/0363991 A1* | 12/2016 | Schlecht | G06Q 30/0266 | |
| 2017/0011580 A1* | 1/2017 | Huang | G06Q 30/0631 | |
| 2017/0057516 A1* | 3/2017 | Gordon | G06Q 50/00 | |
| 2017/0075355 A1* | 3/2017 | Micks | G01S 13/865 | |
| 2017/0090480 A1* | 3/2017 | Ho | B60W 30/00 | |
| 2017/0115125 A1* | 4/2017 | Outwater | G08G 1/123 | |
| 2017/0124547 A1* | 5/2017 | Natarajan | G06Q 20/202 | |
| 2017/0124781 A1* | 5/2017 | Douillard | G08G 1/207 | |
| 2017/0132934 A1* | 5/2017 | Kentley | G05D 1/0088 | |
| 2017/0132960 A1* | 5/2017 | Kis-Benedek Pinero | G06F 1/1637 | |
| 2017/0153714 A1* | 6/2017 | Gao | G05D 1/0088 | |
| 2017/0193434 A1* | 7/2017 | Shah | G05D 1/0212 | |
| 2017/0227962 A1* | 8/2017 | Cesarano | G08G 5/80 | |
| 2017/0248964 A1* | 8/2017 | Kentley | G01S 7/4972 | |
| 2017/0255198 A1* | 9/2017 | Rodriguez | G05D 1/0274 | |
| 2017/0259041 A1* | 9/2017 | Lenker | A61M 25/09041 | |
| 2017/0262790 A1* | 9/2017 | Khasis | G01C 21/3415 | |
| 2017/0313421 A1* | 11/2017 | Gil | B64D 45/04 | |
| 2017/0323253 A1* | 11/2017 | Enssle | G06Q 10/087 | |
| 2018/0025635 A1* | 1/2018 | Cheaz | G05D 1/0297 | 701/23 |
| 2018/0033308 A1* | 2/2018 | Litkouhi | G08G 1/166 | |
| 2018/0053147 A1* | 2/2018 | Zhang | G06Q 10/087 | |
| 2018/0053369 A1* | 2/2018 | High | G07F 9/0235 | |
| 2018/0053423 A1* | 2/2018 | DaCosta | G06Q 30/0633 | |
| 2018/0068253 A1* | 3/2018 | Simms | G06Q 10/083 | |
| 2018/0082343 A1* | 3/2018 | Gordon | G06Q 10/0635 | |
| 2018/0099602 A1* | 4/2018 | Salter | B60Q 1/507 | |
| 2018/0101818 A1* | 4/2018 | Simms | G06Q 10/08 | |
| 2018/0134200 A1* | 5/2018 | Wilkinson | G06Q 10/08 | |
| 2018/0144300 A1* | 5/2018 | Wiechers | G06Q 10/08 | |
| 2018/0157984 A1* | 6/2018 | O'Herlihy | G06N 20/00 | |
| 2018/0158018 A1* | 6/2018 | Luckay | B64C 39/024 | |
| 2018/0165728 A1* | 6/2018 | McDonald | G06Q 30/0207 | |
| 2018/0189716 A1* | 7/2018 | Crone | G06Q 10/083 | |
| 2018/0194411 A1* | 7/2018 | Liivik | B62D 61/10 | |
| 2018/0196416 A1* | 7/2018 | Iagnemma | G06Q 50/40 | |
| 2018/0196417 A1* | 7/2018 | Iagnemma | G06Q 50/40 | |
| 2018/0211541 A1* | 7/2018 | Rakah | G06Q 10/047 | |
| 2018/0232839 A1* | 8/2018 | Heinla | G05B 19/41895 | |
| 2018/0246526 A1* | 8/2018 | Wilkinson | G05D 1/0278 | |
| 2018/0251216 A1* | 9/2018 | Whitaker | B64F 3/00 | |
| 2018/0253108 A1* | 9/2018 | Heinla | G05D 1/65 | |
| 2018/0260778 A1* | 9/2018 | Mazetti | G06Q 10/0875 | |
| 2018/0260780 A1* | 9/2018 | Mazetti | G06Q 10/08355 | |
| 2018/0330313 A1* | 11/2018 | Clarke | G07F 17/12 | |
| 2018/0349872 A1* | 12/2018 | Ahmed | G07G 1/0036 | |
| 2018/0373246 A1* | 12/2018 | Laughlin | G06Q 50/40 | |
| 2018/0374002 A1* | 12/2018 | Li | G06F 3/017 | |
| 2019/0023236 A1* | 1/2019 | Webb | B60S 5/00 | |
| 2019/0033856 A1* | 1/2019 | Ferguson | G06Q 50/40 | |
| 2019/0071176 A1* | 3/2019 | Von Flotow | B64U 10/25 | |
| 2020/0225684 A1* | 7/2020 | Anderson | B64U 70/95 | |
| 2021/0009285 A1* | 1/2021 | Talke | B66D 1/7447 | |
| 2021/0012163 A1* | 1/2021 | Li | E02F 9/261 | |
| 2021/0027828 A1* | 1/2021 | Yamazaki | H10B 99/00 | |
| 2021/0129982 A1* | 5/2021 | Collins | B64U 10/60 | |
| 2021/0171217 A1* | 6/2021 | Brown | B63G 11/00 | |
| 2021/0241636 A1* | 8/2021 | Yu | G08G 5/57 | |
| 2021/0354791 A1* | 11/2021 | Sheldon-Coulson | B67D 7/04 | |
| 2022/0208424 A1* | 6/2022 | Matthews | H01F 3/10 | |
| 2022/0380186 A1* | 12/2022 | Chao | B64F 3/00 | |
| 2025/0026503 A1* | 1/2025 | Miller | B64U 10/14 | |

* cited by examiner

100

108  112  114  110  202

118

104  102

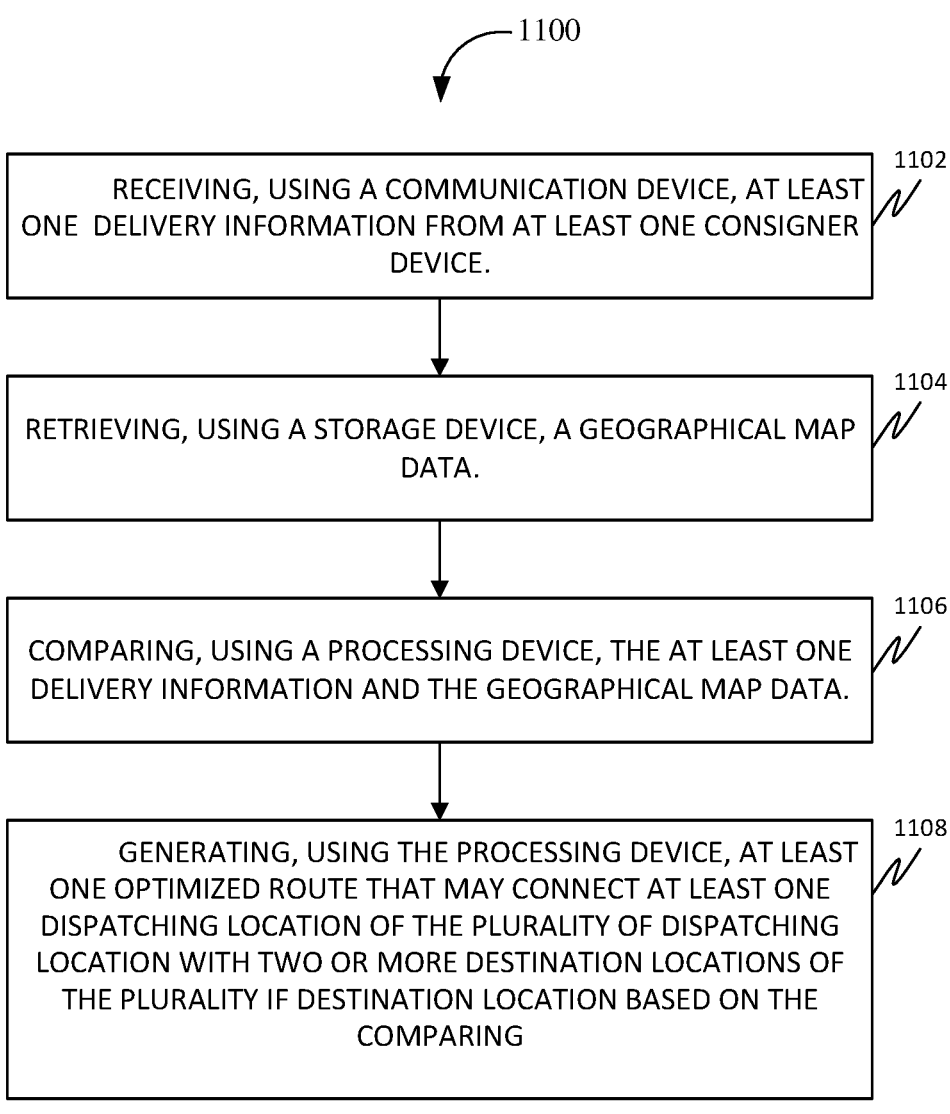

1100

RECEIVING, USING A COMMUNICATION DEVICE, AT LEAST ONE DELIVERY INFORMATION FROM AT LEAST ONE CONSIGNER DEVICE.
1102

RETRIEVING, USING A STORAGE DEVICE, A GEOGRAPHICAL MAP DATA.
1104

COMPARING, USING A PROCESSING DEVICE, THE AT LEAST ONE DELIVERY INFORMATION AND THE GEOGRAPHICAL MAP DATA.
1106

GENERATING, USING THE PROCESSING DEVICE, AT LEAST ONE OPTIMIZED ROUTE THAT MAY CONNECT AT LEAST ONE DISPATCHING LOCATION OF THE PLURALITY OF DISPATCHING LOCATION WITH TWO OR MORE DESTINATION LOCATIONS OF THE PLURALITY IF DESTINATION LOCATION BASED ON THE COMPARING
1108

- AT LEAST ONE
  DISPATCHING REQUEST
- AT LEAST ONE DELIVERY
  CONFIMATION REQUEST
- AT LEAST ONE PARCEL
  ARRIVAL INFORMATION
- AT LEAST ONE PRIORITY
  ORDER INFORMATION

1412

1406

1402

1404

1500

1410

1404

1404

1404

1404

1414

1400

UAV

1416

UNMANNED AERIAL VEHICLE (UAV) FOR FACILITATING AERIAL DELIVERIES OF CARGO

This application claims the benefit of international application No. PCT/US23/21605 filed on May 9, 2023 and titled "AN UNMANNED AERIAL VEHICLE (UAV) FOR FACILITATING AERIAL DELIVERIES OF CARGO" which in turn claims benefit of U.S. Provisional Patent Application No. 63/354,245, titled "METHODS AND SYSTEMS FOR FACILITATING MULTIPLE AERIAL CARGO DELIVERIES USING UNMANNED AERIAL VEHICLES", filed 22 Jun. 2022, which is incorporated by reference herein in its entirety.

FIELD OF THE INVENTION

Generally, the present disclosure relates to the field of unmanned aerial vehicles. More specifically, the present disclosure relates to an unmanned aerial vehicle (UAV) for facilitating aerial deliveries of cargo.

BACKGROUND OF THE INVENTION

The field of unmanned aerial vehicles (UAVs) is technologically important to several industries, business organizations, and/or individuals. In particular, the use of unmanned aerial vehicle applications is prevalent for logistics companies.

Existing techniques for aerial delivery of cargo are deficient with regard to several aspects. For instance, current technologies use tethered tow lines to deliver products and are limited to only one delivery per trip. Further, the cargo system in current unmanned aerial vehicles is specifically designed for a predetermined purpose and inseparably integrated with the aerial vehicle. As a result, different unmanned aerial vehicles are needed for delivering different kinds of cargo. Furthermore, current technologies for aerial cargo deliveries using UAVs are limited to delivering a single cargo per trip.

Therefore, there is a need for an improved unmanned aerial vehicle (UAV) for facilitating aerial deliveries of cargo that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an unmanned aerial vehicle (UAV) for facilitating aerial deliveries of cargo, in accordance with some embodiments. Accordingly, the UAV may include a body defining a receptacle with a receptacle opening within the body. Further, the UAV may include at least one propulsion assembly attached to the body. Further, the at least one propulsion assembly may be configured for aerially propelling the UAV for navigating to at least one delivery location. Further, the UAV may include at least one compartment defining element comprised in the body. Further, the at least one compartment defining element may be configured for defining at least one compartment in the receptacle. Further, each of the at least one compartment may include a compartment interior space and a compartment opening leading into the compartment interior space. Further, each of the at least one compartment removably receives each of at least one cargo in the compartment interior space through the compartment opening of each of the at least one compartment. Further, the UAV may include at least one lid coupled to the body. Further, each of the at least one lid corresponds to each of the at least one compartment. Further, each of the least one lid may be configured for openably closing the compartment opening of each of the at least one compartment by transitioning between a lid open state and a lid closed state. Further, the transitioning of the each of the at least one lid transitions each of the at least one compartment between an opened state and a closed state. Further, each of the at least one cargo may be removably received in the compartment interior space of each of the at least one compartment in the opened state. Further, each of the at least one lid restricts the removably receiving of each of the least one cargo from the compartment interior space of each of the at least one compartment in the closed state. Further, the UAV may include at least one locking device coupled to the at least one lid. Further, each of the at least one locking device corresponds to each of the at least one lid corresponding to each of the at least one compartment. Further, each of the at least one locking device may be configured to be transitioned from a locked state to an unlocked state based on a code. Further, each of the at least one locking device allows the transitioning of each of the at least one lid between the lid open state and the lid closed state in the unlocked state. Further, each of the at least one locking device restricts the transitioning of each of the at least one lid between the lid open state and the lid closed state in the locked state.

Further disclosed herein is an unmanned aerial vehicle (UAV) for facilitating aerial deliveries of cargo, in accordance with some embodiments. Accordingly, the UAV may include a body defining a receptacle with a receptacle opening within the body. Further, the UAV may include at least one propulsion assembly attached to the body. Further, the at least one propulsion assembly may be configured for aerially propelling the UAV for navigating to at least one delivery location. Further, the UAV may include at least one compartment defining element comprised in the body. Further, the at least one compartment defining element may be configured for defining at least one compartment in the receptacle. Further, each of the at least one compartment may include a compartment interior space and a compartment opening leading into the compartment interior space. Further, each of the at least one compartment removably receives each of at least one cargo in the compartment interior space through the compartment opening of each of the at least one compartment. Further, the UAV may include at least one lid coupled to the body. Further, each of the at least one lid corresponds to each of the at least one compartment. Further, each of the least one lid may be configured for openably closing the compartment opening of each of the at least one compartment by transitioning between a lid open state and a lid closed state. Further, the transitioning of the each of the at least one lid transitions each of the at least one compartment between an opened state and a closed state. Further, each of the at least one cargo may be removably received in the compartment interior space of each of the at least one compartment in the opened state. Further, each of the at least one lid restricts the removably receiving of each of the least one cargo from the compartment interior space of each of the at least one compartment in the closed state. Further, the UAV may include at least one locking device coupled to the at least one lid. Further, each of the at least one locking device corresponds to each of the at least one lid corresponding to each of the at least one compartment. Further, each of the at least one locking device may be configured to be transitioned from a locked state to an unlocked state based on a code. Further, each of the at least one locking device allows the transitioning of each of the at least one lid between the lid open state and the lid closed state in the unlocked state. Further, each of the at least one locking device restricts the transitioning of each of the at least one lid between the lid open state and the lid closed state in the locked state. Further, the UAV may include a communication device comprised in the body. Further, the communication device may be configured for receiving at least one delivery data from at least one device. Further, the at least one delivery data may include the at least one delivery location for delivering the at least one cargo. Further, the UAV may include a processing device comprised in the body. Further, the processing device may be communicatively coupled with the communication device. Further, the processing device may be configured for analyzing the at least one delivery data. Further, the processing device may be configured for generating at least one propelling instruction for the at least one propulsion assembly for the aerially propelling of the UAV to the at least one delivery location for delivering of the at least one cargo based on the analyzing. Further, the processing device may be communicatively coupled with the at least one propulsion assembly. Further, the aerially propelling of the UAV to the at least one delivery location may be based on the at least one propelling instruction.

Further disclosed herein is an unmanned aerial vehicle (UAV) for facilitating aerial deliveries of cargo, in accordance with some embodiments. Accordingly, the UAV may include a body defining a receptacle with a receptacle opening within the body. Further, the UAV may include at least one propulsion assembly attached to the body. Further, the at least one propulsion assembly may be configured for aerially propelling the UAV for navigating to at least one delivery location. Further, the UAV may include at least one compartment defining element comprised in the body. Further, the at least one compartment defining element may be configured for defining at least one compartment in the receptacle. Further, each of the at least one compartment may include a compartment interior space and a compartment opening leading into the compartment interior space. Further, each of the at least one compartment removably receives each of at least one cargo in the compartment interior space through the compartment opening of each of the at least one compartment. Further, the at least one compartment defining element may include at least one attachment and at least one panel. Further, the at least one attachment may be disposed on an interior surface of the body in at least one surface location of the interior surface. Further, the at least one attachment may be configured for attaching the at least one panel in at least one configuration to the interior surface of the receptacle. Further, the attaching of the at least one panel defines the at least one compartment in the receptacle. Further, the UAV may include at least one lid coupled to the body. Further, each of the at least one lid corresponds to each of the at least one compartment. Further, each of the least one lid may be configured for openably closing the compartment opening of each of the at least one compartment by transitioning between a lid open state and a lid closed state. Further, the transitioning of the each of the at least one lid transitions each of the at least one compartment between an opened state and a closed state. Further, each of the at least one cargo may be removably received in the compartment interior space of each of the at least one compartment in the opened state. Further, each of the at least one lid restricts the removably receiving of each of the least one cargo from the compartment interior space of each of the at least one compartment in the closed state. Further, the UAV may include at least one locking device coupled to the at least one lid. Further, each of the at least one locking device corresponds to each of the at least one lid corresponding to each of the at least one compartment. Further, each of the at least one locking device may be configured to be transitioned from a locked state to an unlocked state based on a code. Further, each of the at least one locking device allows the transitioning of each of the at least one lid between the lid open state and the lid closed state in the unlocked state. Further, each of the at least one locking device restricts the transitioning of each of the at least one lid between the lid open state and the lid closed state in the locked state.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 11 is a flowchart of a method 1100 for facilitating multiple parcel deliveries at multiple locations using a cargo UAV, in accordance with some embodiments.

DETAIL DESCRIPTIONS OF THE INVENTION

Figure 1:
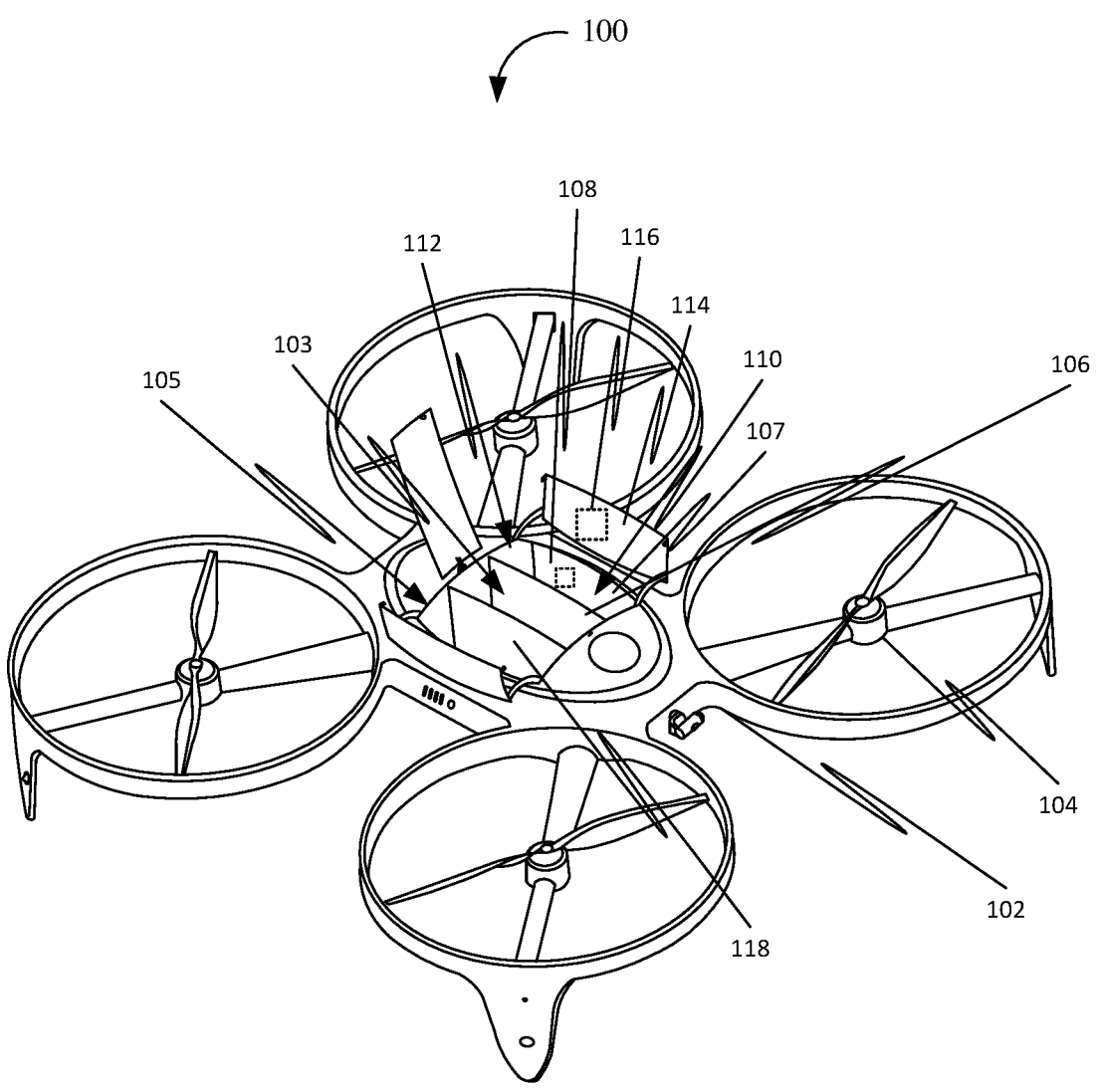
FIG. 1 is a top perspective view of an unmanned aerial vehicle (UAV) 100 for facilitating aerial deliveries of cargo, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of an unmanned aerial vehicle (UAV) for facilitating aerial deliveries of cargo, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes an unmanned aerial vehicle (UAV) for facilitating aerial deliveries of cargo. Further, the disclosed unmanned aerial vehicle (or UAV) may include an airframe that may be designed to decrease noise and ensure safety with an integrated ring system and landing gears. Further, the disclosed systems may include a modular cargo management system that enables the UAV to deliver cargo at multiple stops in one trip in a safe and secure way. Further, the UAV may include servos, motors, and lids assembly to create a connected smart lock that connects to at least one customer mobile app and the modular cargo management system (or flight operation management systems). Furthermore, the UAV may be swapped out to support delivering different types of cargo. Further, the UAV (or cargo UAV) may include an airframe. Further, the airframe may include an integrated ring structure. Further, the integrated ring structure may be configured to reduce noise and vibrations in the airframe during delivery operations by providing a continuous structure. Further, the integrated ring structure may not include joints and loosened components that may cause vibrations and noise. Further, the airframe may include a plurality of landing gears. Further, the plurality of landing gears may be configured for providing safety during the landing of the cargo UAV during the delivery operations. Further, the plurality of landing gears may be configured for providing safety during take-off of the cargo UAV for delivery operations. Further, the airframe may include at least one compartment accommodator. Further, the at least one compartment accommodator may be configured to detachably accommodate at least one compartment. Further, the at least one compartment may include a plurality of side panels and a base. Further, the plurality of side panels and the base may form a compartment space. Further, the compartment space of the at least one compartment may be opened at a first end. Further, the compartment space may be closed at a second end by the base. Further, the compartment space may be surrounded by the plurality of side panels. Further, the compartment space of the at least one compartment may be configured for accommodating at least one parcel of the plurality of parcels to be delivered to a plurality of destinations using the cargo UAV. Further, the at least one compartment may include a covering lid. Further, the covering lid may include a covering panel. Further, the covering panel may include an inside surface and an outside surface. Further, the covering lid may include an open-and-shut mechanism. Further, the open-and-shut mechanism may be configured for transitioning the covering lid between an open state and a closed state. Further, in the closed state, the covering lid may be placed on the first end of the at least one compartment to completely enclose the compartment space. Further, in the closed state, the inside surface of the covering panel may be exposed to the compartment space. Further, in the open state, the inside surface of the covering panel may not be exposed to the compartment space and may not completely cover the compartment space so that compartment space may become accessible for an authorized individual for handling the at least one parcel inside the compartment space. Further, the open-and-shut mechanism may include hinge joints, snap-fit assemblies, threading joints, etc. Further, a smart lock may be configured for transitioning the covering lid between a locked state and an unlocked state. Further, in the locked state, the covering lid may not be transitioned from the closed state to the open state. Further, in the unlocked state, the covering lid may be transitioned from the closed state to the open state by the authorized individual. Further, the authorized individual may include a genuine recipient of the at least one parcel, a consigner of the at least one parcel, etc. Further, the smart lock may be controlled remotely. Further, the airframe may include a plurality of propellers. Further, each propeller of the plurality of propellers may include a plurality of propeller blades and a propeller axis. Further, the integrated ring structure may be configured for securing the plurality of propeller blades. Further, the plurality of propeller blades may be configured to spin about the propeller axis to generate lift. Further, in some embodiments, the plurality of propeller blades may include an airfoil profile. Further, the cargo UAV may include a rechargeable battery. Further, the rechargeable battery may be configured for supplying power to different components of the cargo UAV. Further, the rechargeable battery may be configured to be recharged by electricity. Further, the cargo UAV may include a plurality of solar panels. Further, the plurality of solar panels may be configured for charging the rechargeable battery by converting solar energy into electricity. Further, the rechargeable battery may be charged wirelessly. Further, the cargo UAV may include a plurality of motors. Further, the plurality of motors may be configured for spinning the plurality of propellers. Further, the plurality of motors may be powered by the rechargeable battery. Furthermore, the cargo UAV may include a plurality of servomotors. Further, the plurality of servomotors may be configured for precisely controlling angular position, linear position, velocity, and acceleration of the cargo UAV. Further, the cargo UAV may include at least one camera. Further, the at least one camera may be configured for capturing a plurality of stills of the surroundings of the cargo UAV at one or more locations in a path of the cargo UAV during delivering of multiple parcels to multiple destinations. Further, the at least one camera may be powered by the rechargeable battery. Further, the at least one camera may be communicatively coupled with a modular cargo management system. Further, the modular cargo management system may be configured for enabling the cargo UAV to deliver the plurality of parcels to the plurality of destinations in a single trip. Further, the modular cargo management system may be communicatively coupled with a plurality of consigner devices and a plurality of recipient devices. Further, the plurality of recipient devices may be associated with a plurality of recipients. Further, the plurality of recipients may receive the plurality of parcels delivered by the cargo UAV. Further, the plurality of consigner devices may be associated with a plurality of consigners. Further, the plurality of consigners may dispatch the plurality of parcels to be delivered using the cargo UAV.

Further, in some embodiments, the cargo UAV includes a plurality of landing gears. Further, the plurality of landing gears may be configured for facilitating safe take-off and safe landing of the cargo UAV for successful delivery operations.

FIG. 1 is a top perspective view of an unmanned aerial vehicle (UAV) 100 for facilitating aerial deliveries of cargo, in accordance with some embodiments. Accordingly, the UAV 100 may include a body 102 defining a receptacle 103 with a receptacle opening 105 within the body 102. Further, the UAV 100 may include a delivery drone. Further, the body 102 may be an airframe.

Further, the UAV 100 may include at least one propulsion assembly 104 attached to the body 102. Further, the at least one propulsion assembly 104 may be configured for aerially propelling the UAV 100 for navigating to at least one delivery location. Further, the at least one propulsion assembly 104 may be configured for generating a thrust in at least one direction in relation to the UAV 100 for the aerially propelling the UAV 100 for navigating the UAV 100 to the at least one delivery location. Further, the at least one propulsion assembly 104 lands and takes off the UAV 100. Further, the at least one propulsion assembly 104 may include an actuator and a propeller. Further, the actuator may include an electric motor (such as a servo motor). Further, the at least one propulsion assembly 104 may be electrically powered.

Further, the UAV 100 may include at least one compartment defining element 106 comprised in the body 102. Further, the at least one compartment defining element 106 may be configured for defining at least one compartment 108 in the receptacle 103. Further, each of the at least one compartment 108 may include a compartment interior space 110 and a compartment opening 112 leading into the compartment interior space 110. Further, each of the at least one compartment 108 removably receives each of at least one cargo in the compartment interior space 110 through the compartment opening 112 of each of the at least one compartment 108. Further, the at least one cargo may include a parcel, an object, etc. Further, the at least one cargo may be disposed in the compartment interior space 110 through the compartment opening 112 of each of the at least one compartment 108 for delivering the at least one cargo in the at least one delivery location.

Further, the UAV 100 may include at least one lid 114 coupled to the body 102. Further, the at least one lid 114 may be a covering lid. Further, each of the at least one lid 114 corresponds to each of the at least one compartment 108. Further, each of the at least one lid 114 may be configured for openably closing the compartment opening 112 of each of the at least one compartment 108 by transitioning between a lid open state and a lid closed state. Further, the transitioning of the each of the at least one lid 114 transitions each of the at least one compartment 108 between an opened state and a closed state. Further, each of the at least one cargo may be removably received in the compartment interior space 110 of each of the at least one compartment 108 in the opened state. Further, each of the at least one lid 114 restricts the removably receiving of each of the least one cargo from the compartment interior space 110 of each of the at least one compartment 108 in the closed state.

Further, the UAV 100 may include at least one locking device 116 coupled to the at least one lid 114. Further, the at least one locking device 116 may include an electronic lock, a smart lock, etc. Further, the at least one locking device 116 may be electrically powered. Further, the at least one locking device 116 may be an electronic device with a processing device, a locking mechanism, an actuator, a sensor, and an input device. Further, the actuator actuates the locking mechanism for transitioning the at least one locking device 116 between a locked state and an unlocked state based on a code received through the input device. Further, each of the at least one locking device 116 corresponds to each of the at least one lid 114 corresponding to each of the at least one compartment 108. Further, each of the at least one locking device 116 may be configured to be transitioned from a locked state to an unlocked state based on a code. Further, the code may include one or more characters, one or more numerals, an image, an audio, etc. Further, each of the at least one locking device 116 allows the transitioning of each of the at least one lid 114 between the lid open state and the lid closed state in the unlocked state. Further, each of the at least one locking device 116 restricts the transitioning of each of the at least one lid 114 between the lid open state and the lid closed state in the locked state.

Further, in some embodiments, the defining of the at least one compartment 108 in the receptacle 103 may include defining the at least one compartment 108 with at least one compartment characteristic. Further, the at least one compartment characteristic may include a shape, a size, a volume, etc., of the at least one compartment 108. Further, the compartment interior space 110 and the compartment opening 112 of each of the at least one compartment 108 may be based on the at least one compartment characteristic.

Further, in some embodiments, the at least one compartment defining element 106 may include at least one attachment 202. Further, the at least one attachment 202 may be disposed on an interior surface 107 of the body 102 in at least one surface location of the interior surface 107. Further, the at least one attachment 202 may be fixedly attached to the interior surface 107. Further, the at least one attachment 202 may be configured for attaching at least one panel 118 (such as a side panel) in at least one configuration to the interior surface 107 of the receptacle 103. Further, the at least one configuration may include an orientation, a position, etc., of the at least one panel 118 in the receptacle 103. Further, the attaching of the at least one panel 118 defines the at least one compartment 108 in the receptacle 103. Further, the at least one attachment 202 may include a channel on an exterior surface of the at least one attachment 202. Further, the at least one attachment 202 receives at least a portion of the at least one panel 118 for the attaching of the at least one panel 118 to the interior surface 107 of the receptacle 103.

Further, in some embodiments, the at least one attachment 202 may be configured for removably attaching the at least one panel 118 in the at least one configuration to the interior surface 107 of the receptacle 103. Further, the removably attaching of the at least one panel 118 defines the at least one compartment 108 in the receptacle 103.

Further, in some embodiments, the at least one compartment defining element 106 may include the at least one panel 118. Further, the at least one panel 118 may be configured to be attached in the at least one configuration to the interior surface 107 of the receptacle 103 using the at least one attachment 202 disposed on the interior surface 107 for the defining of the at least one compartment 108.

Further, in some embodiments, the at least one panel 118 may be configured to be removably attached in the at least one configuration to the interior surface 107 of the receptacle 103 using the at least one attachment 202 for the defining of the at least one compartment 108.

In further embodiments, the UAV 100 may include a primary lid 204 coupled to the body 102. Further, the primary lid 204 may be configured for openably closing the receptacle opening 105 by transitioning between a primary lid open state and a primary lid closed state. Further, the primary lid 204 allows the transitioning of the at least one lid 114 in the primary lid open state. Further, the primary lid 204 restricts the transitioning of the at least one lid 114 in the primary lid closed state.

Figure 2:
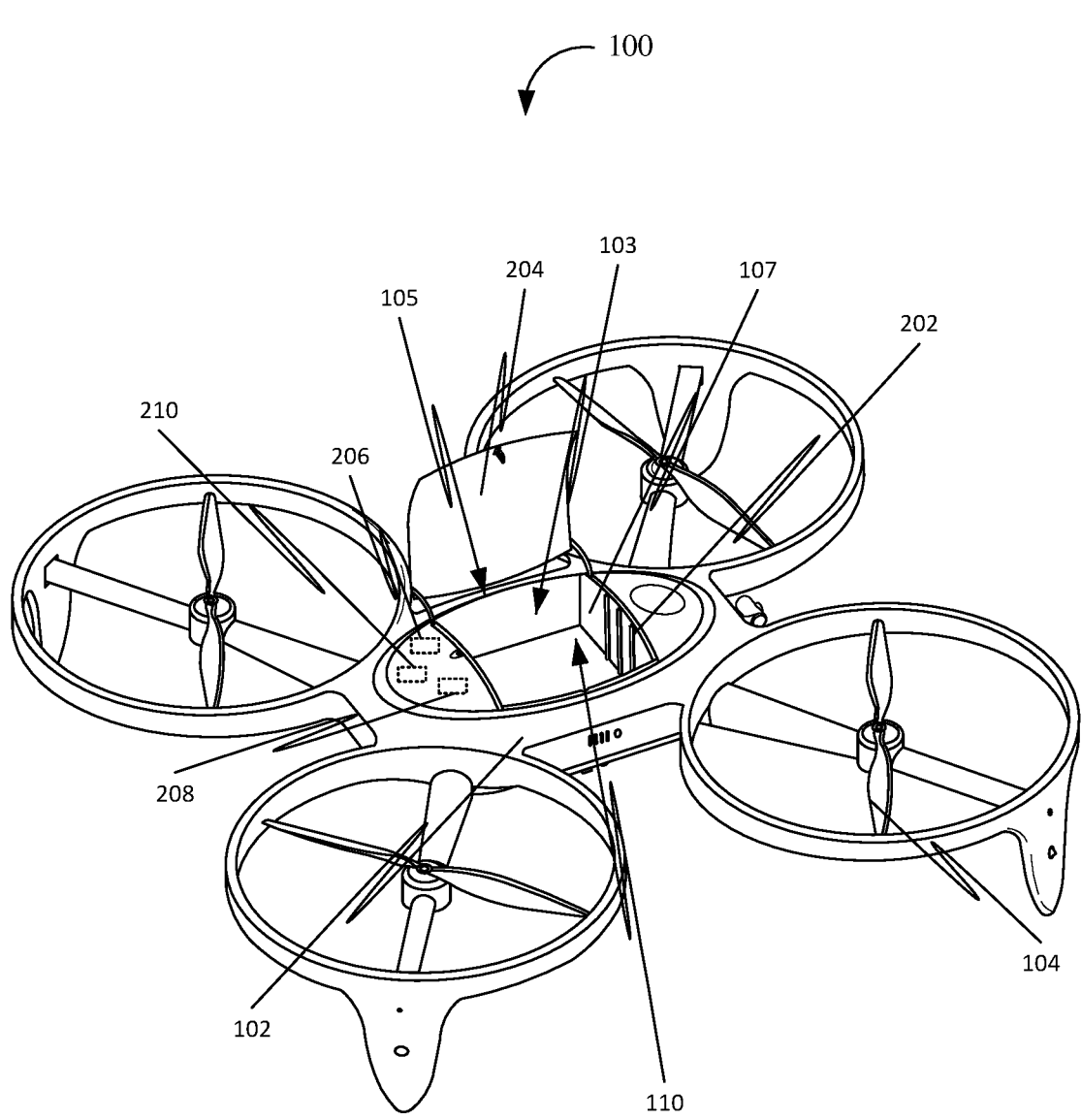
FIG. 2 is a top perspective view of the unmanned aerial vehicle (UAV) 100 for facilitating aerial deliveries of cargo, in accordance with some embodiments.

In further embodiments, the UAV 100 may include a communication device 206 (as shown in FIG. 2) comprised in the body 102. Further, the communication device 206 may be configured for receiving at least one delivery data from at least one device. Further, the at least one delivery data may include the at least one delivery location for delivering the at least one cargo. Further, the UAV 100 may include a processing device 208 (as shown in FIG. 2) comprised in the body 102. Further, the processing device 208 may be communicatively coupled with the communication device 206. Further, the processing device 208 may be configured for analyzing the at least one delivery data. Further, the processing device 208 may be configured for generating at least one propelling instruction for the at least one propulsion assembly 104 for the aerially propelling of the UAV 100 to the at least one delivery location for delivering of the at least one cargo based on the analyzing. Further, the processing device 208 may be communicatively coupled with the at least one propulsion assembly 104. Further, the aerially propelling of the UAV 100 to the at least one delivery location may be based on the at least one propelling instruction. In further embodiments, the UAV 100 may include at least one sensor 210 (as shown in FIG. 2) comprised in the body 102. Further, the at least one sensor 210 (such as a location sensor, a camera, etc.) may be communicatively coupled with the processing device 208. Further, the at least one sensor 210 may be configured for generating at least one location data associated with a current location of the UAV 100. Further, the processing device 208 may be configured for analyzing the at least one location data. Further, the processing device 208 may be configured for determining at least one route to navigate to the at least one delivery location from the current location based on the analyzing of the at least one location data and the analyzing of the at least one delivery data. Further, the at least one route may be comprised in a path of the UAV 100 for delivering the at least one cargo. Further, the path may be a single flight path traversed by the UAV 100 for delivering the at least one cargo. Further, the generating of the at least one propelling instruction may be based on the at least one route.

Further, in some embodiments, the communication device 206 may be configured for receiving at least one priority order information from at least one first device. Further, the at least one priority order information may include a prioritizing order of each of the at least one cargo. Further, the processing device 208 may be configured for analyzing the at least one priority order information. Further, the processing device 208 may be configured for generating at least one route for the delivering of each of the at least one cargo in the prioritizing order based on the analyzing of the at least one priority order information and the analyzing of the at least one delivery data. Further, the generating of the at least one propelling instruction may be based on the at least one route.

Figure 3:
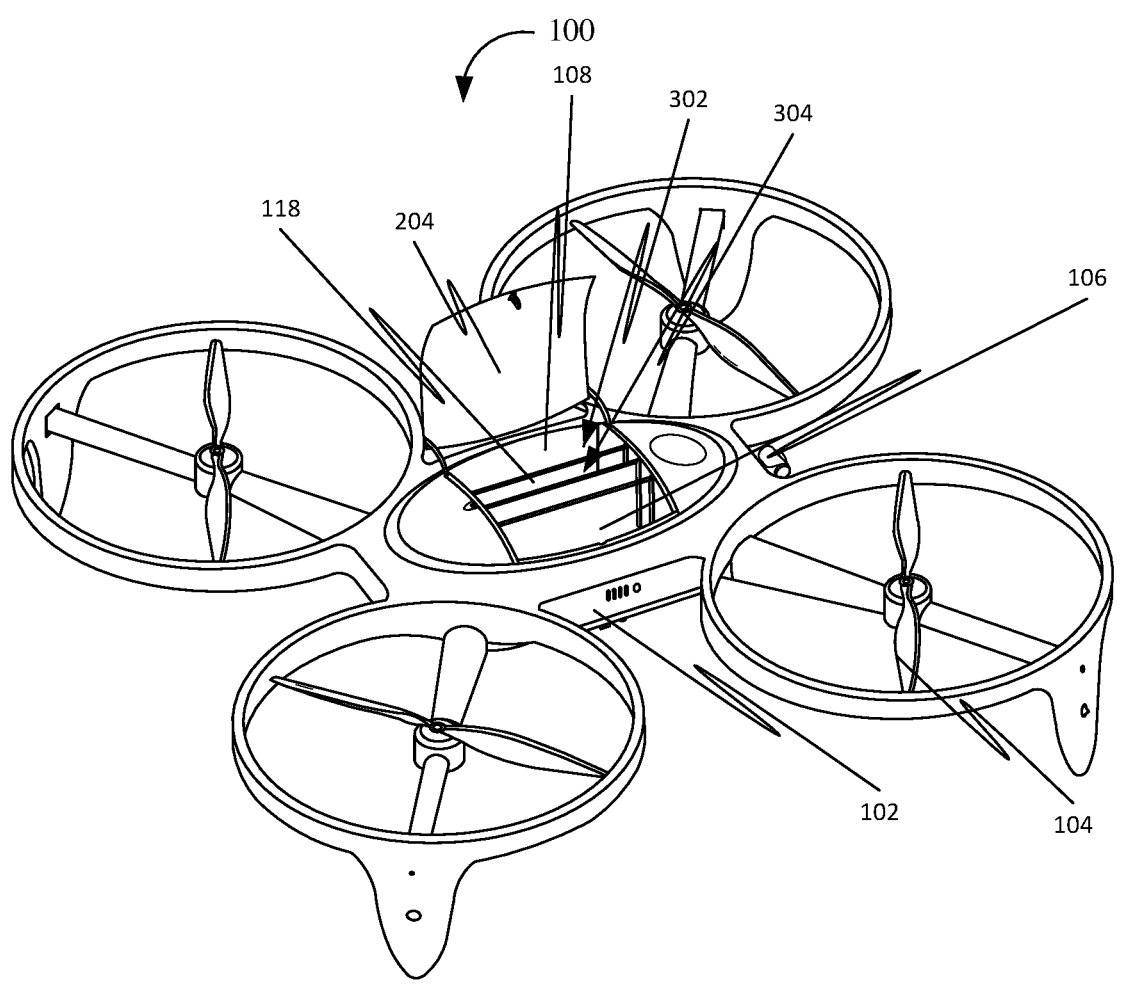
FIG. 3 is a top perspective view of the unmanned aerial vehicle (UAV) 100 for facilitating aerial deliveries of cargo, in accordance with some embodiments.

Further, in some embodiments, the defining of the at least one compartment 108 may include defining a plurality of compartments 302-304 (as shown in FIG. 3) in the receptacle 103. Further, each of the plurality of compartments 302-304 may include the compartment interior space 110 and the compartment opening 112 leading into the compartment interior space 110. Further, the at least one cargo may include a plurality of cargos. Further, each of the plurality of compartments 302-304 removably receives each of the plurality of cargos in the compartment interior space 110 through the compartment opening 112 of each of the plurality of compartments 302-304.

Further, in some embodiments, each of the at least one locking device 116 may be associated with an assigned code. Further, the assigned code may include one or more characters, one or more numerals, an image, an audio, etc. Further, each of the at least one locking device 116 may be configured for obtaining the code through an input device from each of at least one user associated with each of the at least one cargo. Further, the at least one user may be a genuine recipient of the at least one cargo. Further, the input device may include a sensor (such as a camera), a keyboard, a touchscreen, a communication interface, etc. Further, each of the at least one locking device 116 may be configured for comparing the assigned code with the code. Further, each of the at least one locking device 116 may be configured for authenticating each of the at least one user based on the comparing. Further, the transitioning of each of the at least one locking device 116 from the locked state to the unlocked state may be based on the authenticating.

Further, in an embodiment, the at least one propelling instruction may include a first propelling instruction. Further, the at least one propulsion assembly 104 navigates and lands the UAV 100 in a first delivery location of the at least one delivery location based on the first propelling instruction. Further, the communication device 206 may be configured for transmitting a first assigned code for the delivering of a first cargo of the at least one cargo, to a first user device associated with a first user. Further, a first locking device of the at least one locking device 116 may be associated with a first lid of the at least one lid 114 that openably closes a first compartment of the at least one compartment 108 which includes the first cargo. Further, the first assigned code may be associated with the first locking device. Further, the first locking device may be configured for obtaining a first code through the input device from a first user associated with the first cargo. Further, the first locking device may be configured for comparing the first assigned code with the first code. Further, the first locking device may be configured for authenticating the first user based on the comparing of the first assigned code and the first code. Further, the transitioning of the first locking device from the locked state to the unlocked state may be based on the authenticating of the first user. Further, the first lid may be openable by the first user for receiving the first cargo.

Further, in an embodiment, the UAV 100 may include a sensor communicatively coupled with the processing device 208. Further, the sensor may be disposed in each of the at least one compartment 108. Further, the sensor may be configured for generating a sensor data based on detecting a removal of the first cargo from the first compartment. Further, the processing device 208 may be configured for determining a route to a second delivery location from the first delivery location based on the sensor data. Further, the generating of the at least one propelling instruction may include generating a second propelling instruction for the at least one propulsion assembly 104 for navigating the UAV 100 to the second delivery location from the first delivery location.

Further, in an embodiment, the processing device 208, the communication device 206, at least one sensor 210, the at least one locking device 116, and the sensor form the modular cargo management system.

Further, in some embodiments, the UAV 100 may include a plurality of solar panels. Further, the plurality of solar panels may be configured for charging a rechargeable battery by converting solar energy into electricity. Further, the rechargeable battery may be charged wirelessly.

Further, in some embodiments, the UAV 100 may include at least one camera.

Further, in some embodiments, the UAV 100 may include at least one lighting device such as a LED.

Further, in some embodiments, the UAV 100 includes a plurality of landing gears.

FIG. 2 is a top perspective view of the unmanned aerial vehicle (UAV) 100 for facilitating aerial deliveries of cargo, in accordance with some embodiments.

FIG. 3 is a top perspective view of the unmanned aerial vehicle (UAV) 100 for facilitating aerial deliveries of cargo, in accordance with some embodiments.

Figure 4:
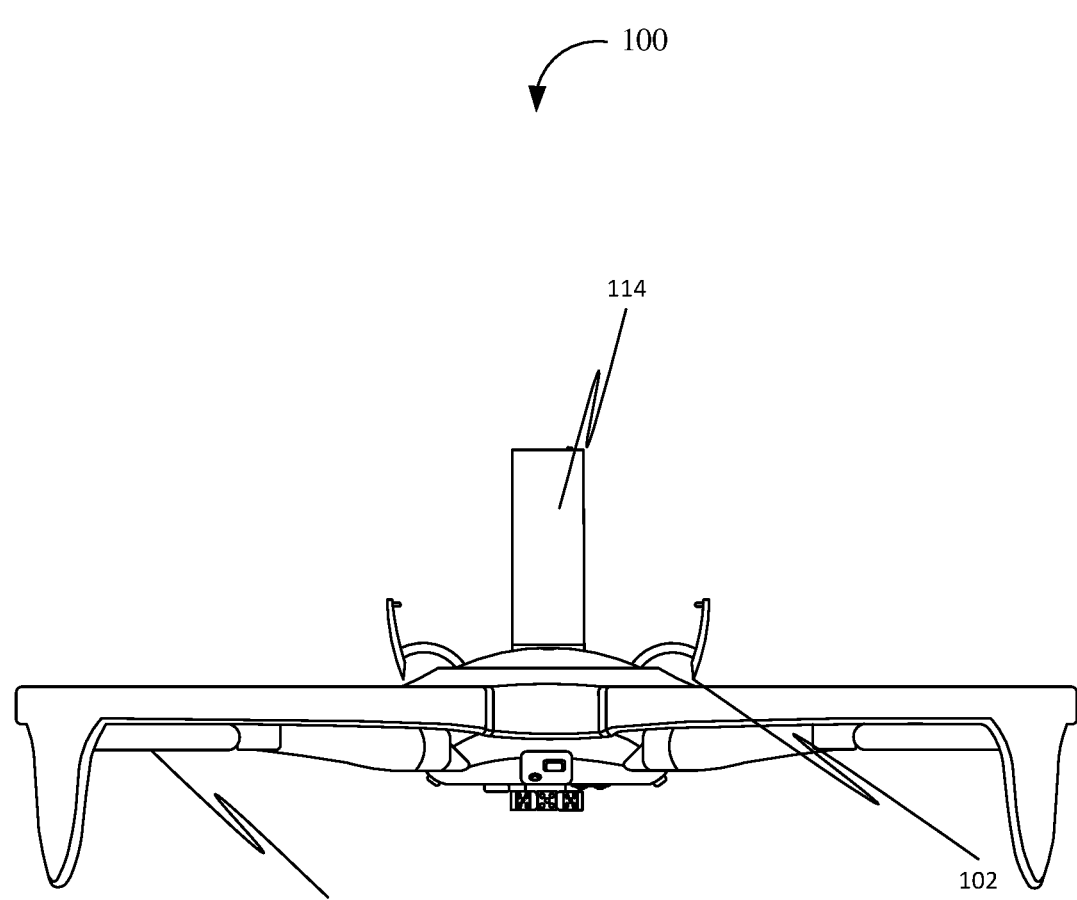
FIG. 4 is a front view of the unmanned aerial vehicle (UAV) 100 for facilitating aerial deliveries of cargo, in accordance with some embodiments.

FIG. 4 is a front view of the unmanned aerial vehicle (UAV) 100 for facilitating aerial deliveries of cargo, in accordance with some embodiments.

Figure 5:
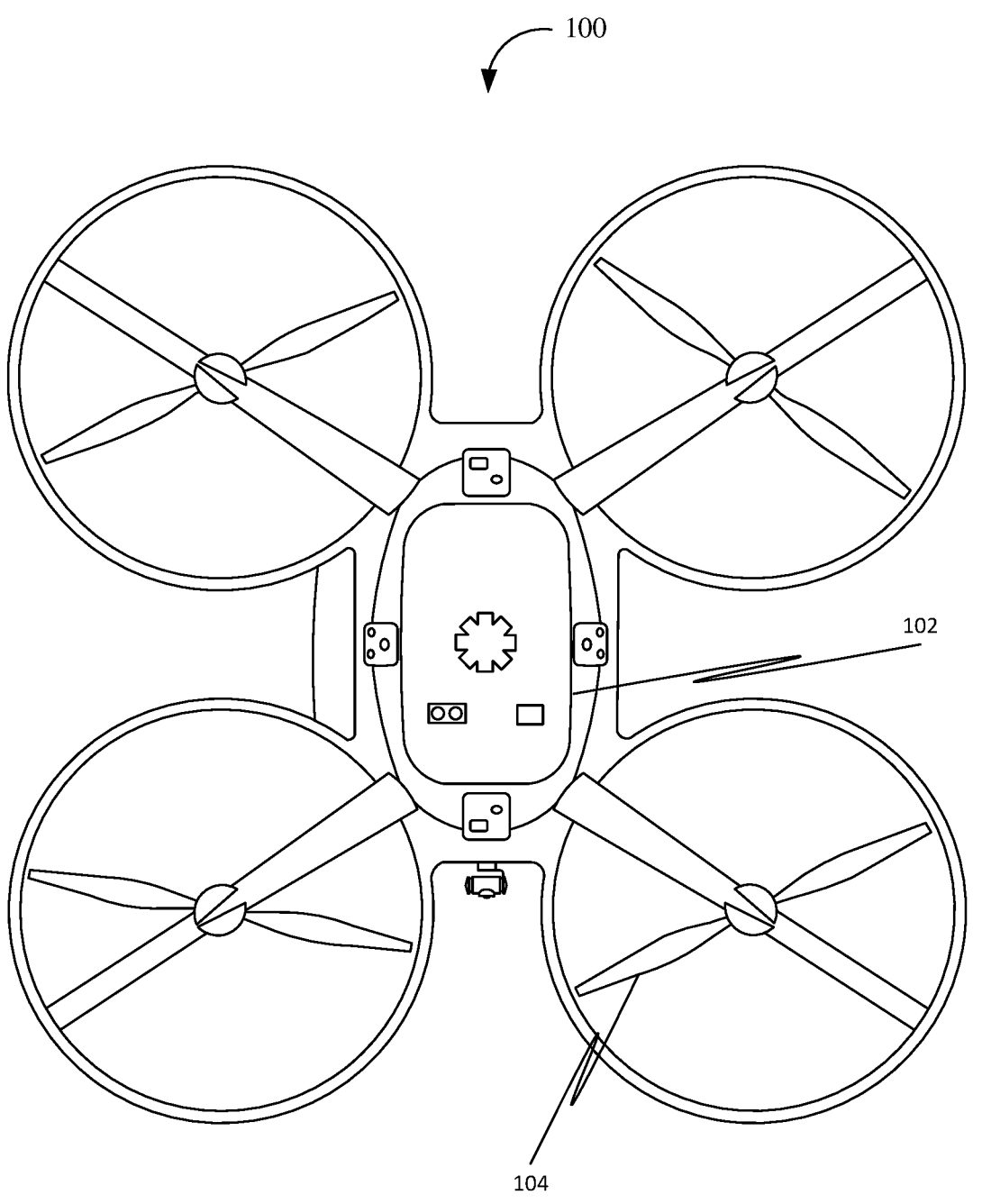
FIG. 5 is a bottom view of the unmanned aerial vehicle (UAV) 100 for facilitating aerial deliveries of cargo, in accordance with some embodiments.

FIG. 5 is a bottom view of the unmanned aerial vehicle (UAV) 100 for facilitating aerial deliveries of cargo, in accordance with some embodiments.

Figure 6:
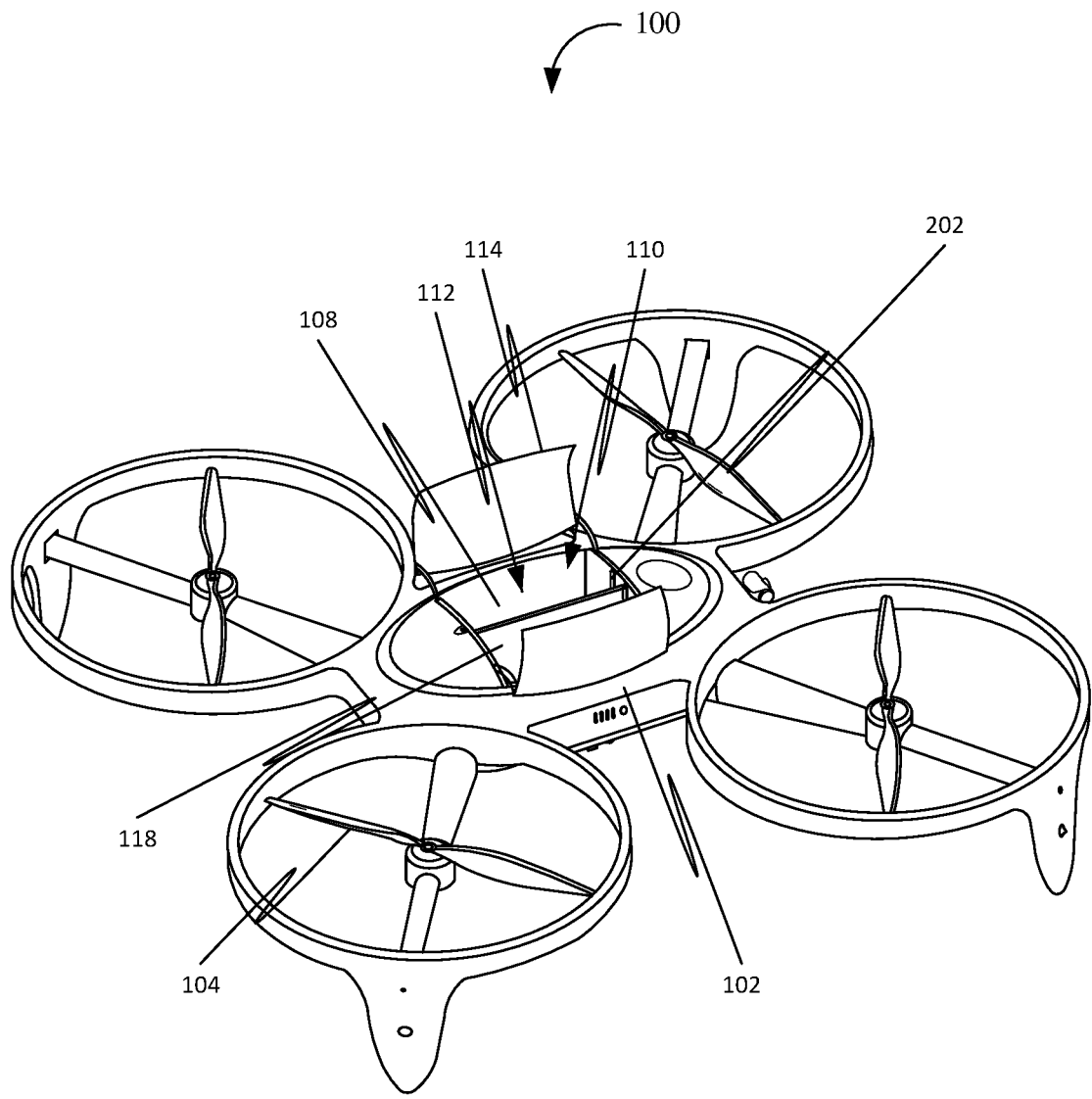
FIG. 6 is a top perspective view of the unmanned aerial vehicle (UAV) 100 for facilitating aerial deliveries of cargo, in accordance with some embodiments.

FIG. 6 is a top perspective view of the unmanned aerial vehicle (UAV) 100 for facilitating aerial deliveries of cargo, in accordance with some embodiments.

Figure 7:
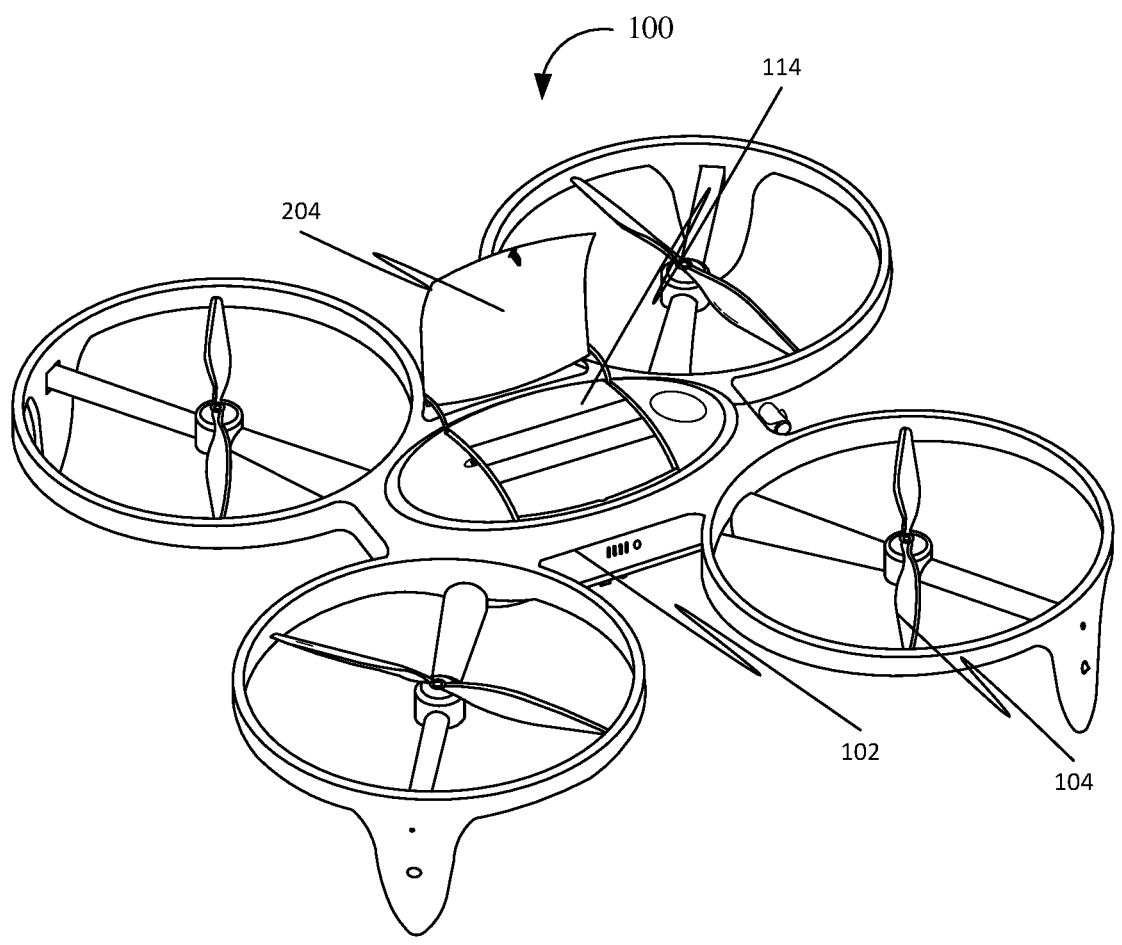
FIG. 7 is a top perspective view of the unmanned aerial vehicle (UAV) 100 for facilitating aerial deliveries of cargo, in accordance with some embodiments.

FIG. 7 is a top perspective view of the unmanned aerial vehicle (UAV) 100 for facilitating aerial deliveries of cargo, in accordance with some embodiments.

Figure 8:
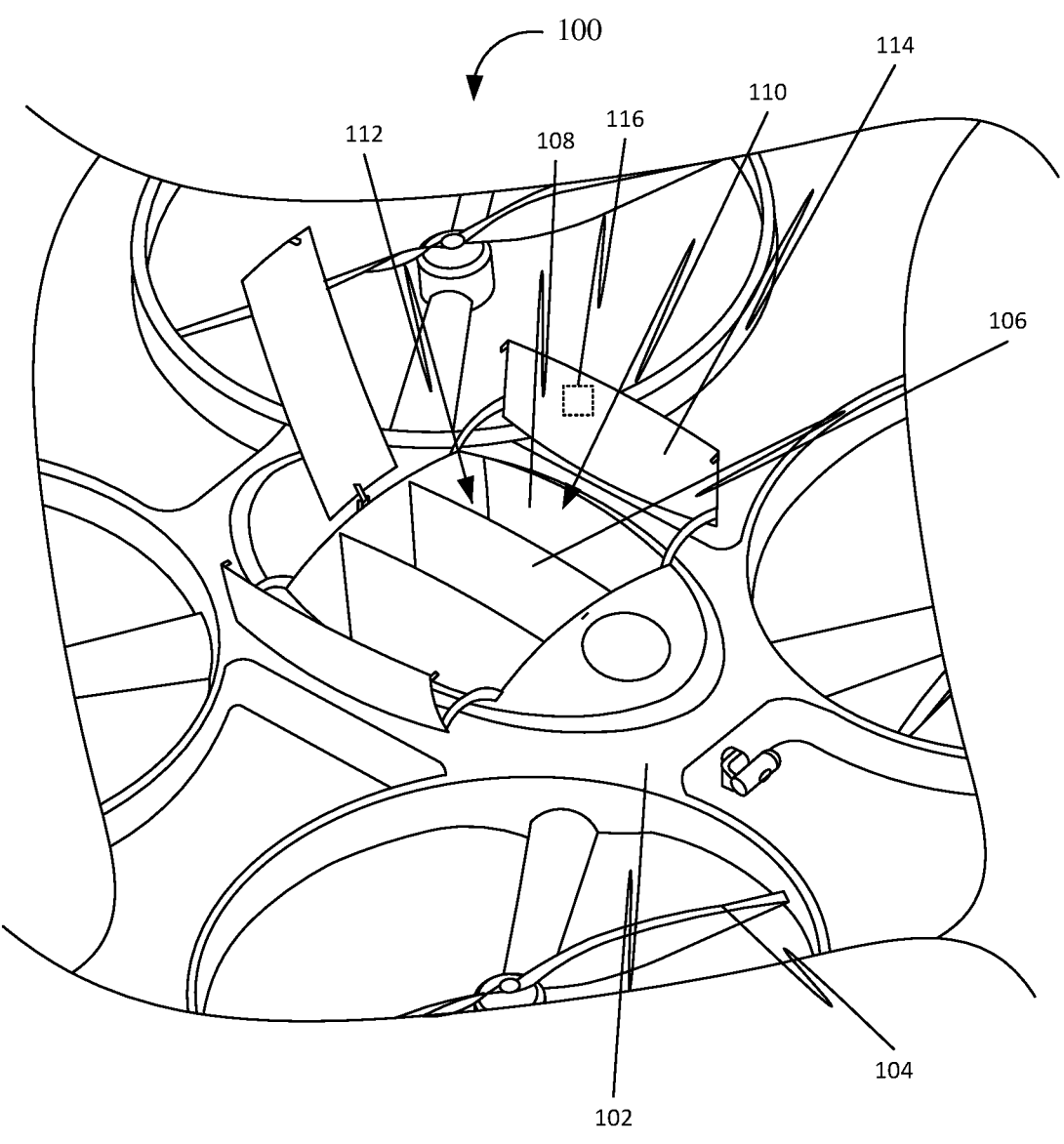
FIG. 8 is a partial top perspective view of the unmanned aerial vehicle (UAV) 100 for facilitating aerial deliveries of cargo, in accordance with some embodiments.

FIG. 8 is a partial top perspective view of the unmanned aerial vehicle (UAV) 100 for facilitating aerial deliveries of cargo, in accordance with some embodiments.

Figure 9:
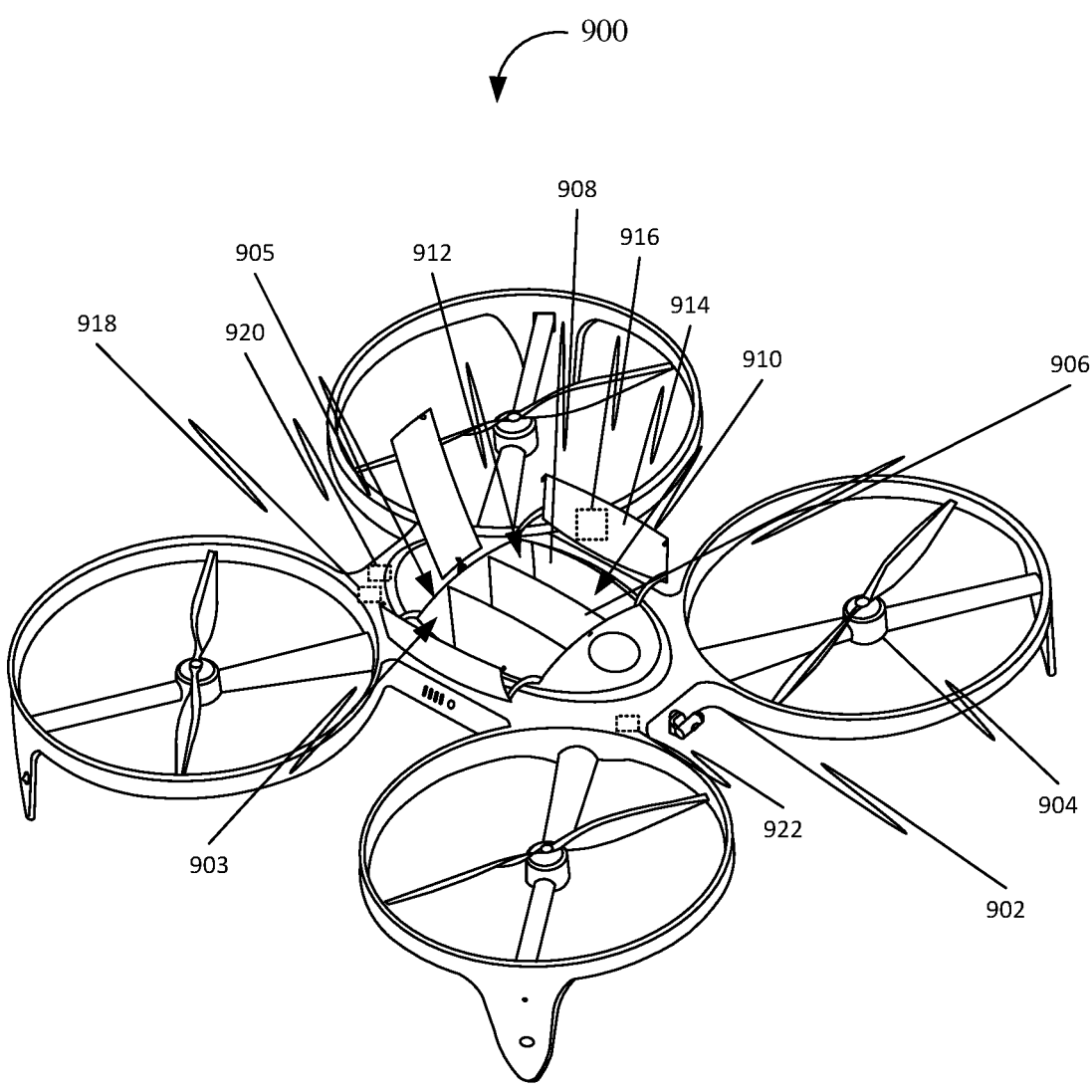
FIG. 9 is a top perspective view of an unmanned aerial vehicle (UAV) 900 for facilitating aerial deliveries of cargo, in accordance with some embodiments.

FIG. 9 is a top perspective view of an unmanned aerial vehicle (UAV) 900 for facilitating aerial deliveries of cargo, in accordance with some embodiments. Accordingly, the UAV 900 may include a body 902 defining a receptacle 903 with a receptacle opening 905 within the body 902.

Further, the UAV 900 may include at least one propulsion assembly 904 attached to the body 902. Further, the at least one propulsion assembly 904 may be configured for aerially propelling the UAV 900 for navigating to at least one delivery location.

Further, the UAV 900 may include at least one compartment defining element 906 comprised in the body 902. Further, the at least one compartment defining element 906 may be configured for defining at least one compartment 908 in the receptacle 903. Further, each of the at least one compartment 908 may include a compartment interior space 910 and a compartment opening 912 leading into the compartment interior space 910. Further, each of the at least one compartment 908 removably receives each of at least one cargo in the compartment interior space 910 through the compartment opening 912 of each of the at least one compartment 908.

Further, the UAV 900 may include at least one lid 914 coupled to the body 902. Further, each of the at least one lid 914 corresponds to each of the at least one compartment 908. Further, each of the at least one lid 914 may be configured for openably closing the compartment opening 912 of each of the at least one compartment 908 by transitioning between a lid open state and a lid closed state. Further, the transitioning of the each of the at least one lid 914 transitions each of the at least one compartment 908 between an opened state and a closed state. Further, each of the at least one cargo may be removably received in the compartment interior space 910 of each of the at least one compartment 908 in the opened state. Further, each of the at least one lid 914 restricts the removably receiving of each of the least one cargo from the compartment interior space 910 of each of the at least one compartment 908 in the closed state.

Further, the UAV 900 may include at least one locking device 916 coupled to the at least one lid 914. Further, each of the at least one locking device 916 corresponds to each of the at least one lid 914 corresponding to each of the at least one compartment 908. Further, each of the at least one locking device 916 may be configured to be transitioned from a locked state to an unlocked state based on a code. Further, each of the at least one locking device 916 allows the transitioning of each of the at least one lid 914 between the lid open state and the lid closed state in the unlocked state. Further, each of the at least one locking device 916 restricts the transitioning of each of the at least one lid 914 between the lid open state and the lid closed state in the locked state.

Further, the UAV 900 may include a communication device 918 comprised in the body 902. Further, the communication device 918 may be configured for receiving at least one delivery data from at least one device. Further, the at least one delivery data may include the at least one delivery location for delivering the at least one cargo.

Further, the UAV 900 may include a processing device 920 comprised in the body 902. Further, the processing device 920 may be communicatively coupled with the communication device 918. Further, the processing device 920 may be configured for analyzing the at least one delivery data. Further, the processing device 920 may be configured for generating at least one propelling instruction for the at least one propulsion assembly 904 for the aerially propelling of the UAV 900 to the at least one delivery location for delivering of the at least one cargo based on the analyzing. Further, the processing device 920 may be communicatively coupled with the at least one propulsion assembly 904. Further, the aerially propelling of the UAV 900 to the at least one delivery location may be based on the at least one propelling instruction.

In further embodiments, the UAV 900 may include at least one sensor 922 comprised in the body 902. Further, the at least one sensor 922 may be communicatively coupled with the processing device 920. Further, the at least one sensor 922 may be configured for generating at least one location data associated with a current location of the UAV 900. Further, the processing device 920 may be configured for analyzing the at least one location data. Further, the processing device 920 may be configured for determining at least one route to navigate to the at least one delivery location from the current location based on the analyzing of the at least one location data and the analyzing of the at least one delivery data. Further, the generating of the at least one propelling instruction may be based on the at least one route.

Further, in some embodiments, the communication device 918 may be configured for receiving at least one priority order information from at least one first device. Further, the at least one priority order information may include a prioritizing order of each of the at least one cargo. Further, the processing device 920 may be configured for analyzing the at least one priority order information. Further, the processing device 920 may be configured for generating at least one route for the delivering of each of the at least one cargo in the prioritizing order based on the analyzing of the at least one priority order information and the analyzing of the at least one delivery data. Further, the generating of the at least one propelling instruction may be based on the at least one route.

Further, in some embodiments, each of the at least one locking device 916 may be associated with an assigned code. Further, each of the at least one locking device 916 may be configured for obtaining the code through an input device from each of at least one user associated with each of the at least one cargo. Further, each of the at least one locking device 916 may be configured for comparing the assigned code with the code. Further, each of the at least one locking device 916 may be configured for authenticating each of the at least one user based on the comparing. Further, the transitioning of each of the at least one locking device 916 from the locked state to the unlocked state may be based on the authenticating.

Figure 10:
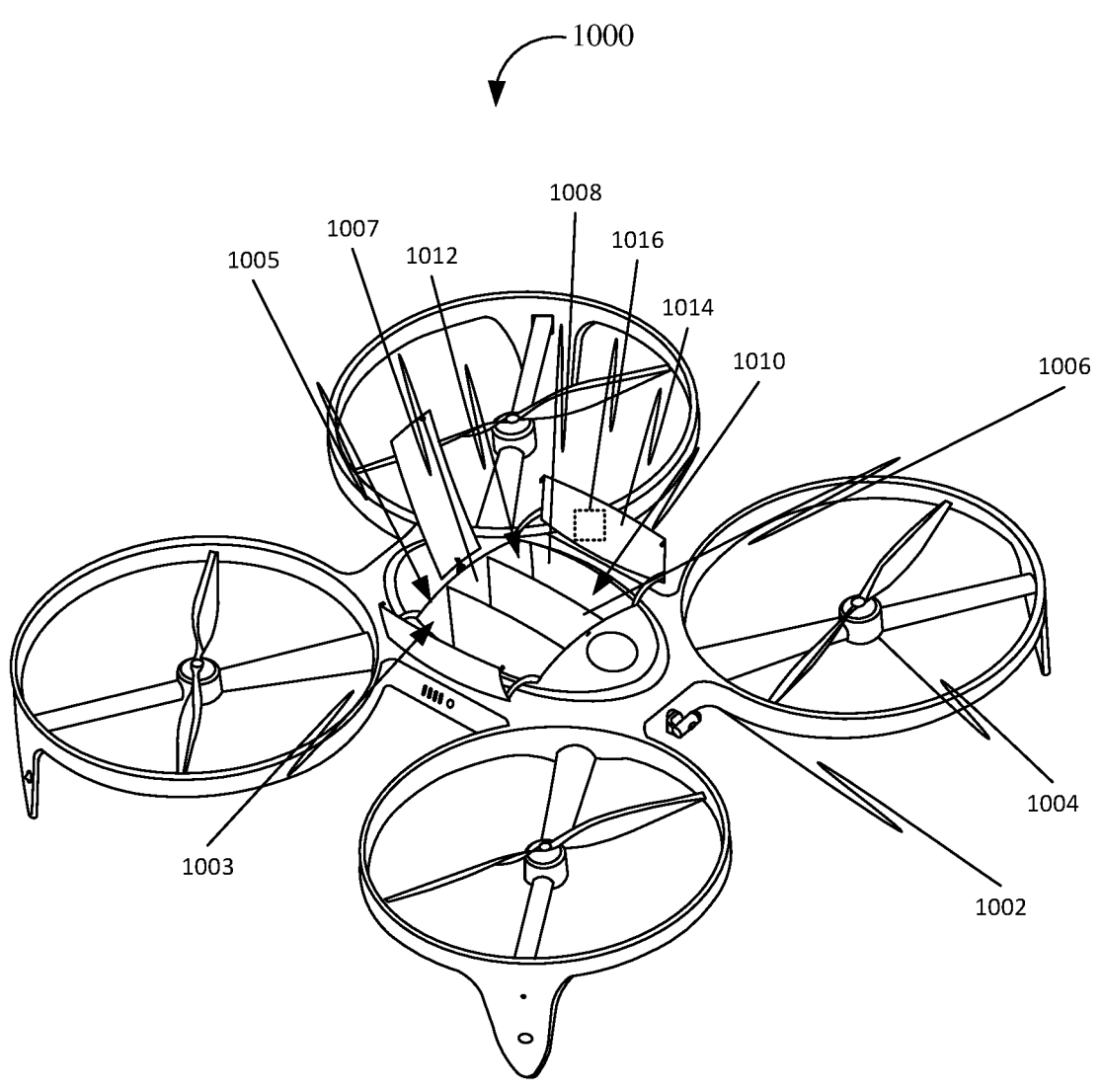
FIG. 10 is a top perspective view of an unmanned aerial vehicle (UAV) 1000 for facilitating aerial deliveries of cargo, in accordance with some embodiments.

FIG. 10 is a top perspective view of an unmanned aerial vehicle (UAV) 1000 for facilitating aerial deliveries of cargo, in accordance with some embodiments. Accordingly, the UAV 1000 may include a body 1002 defining a receptacle 1003 with a receptacle opening 1005 within the body 1002. Further, the UAV 1000 may include at least one propulsion assembly 1004 attached to the body 1002. Further, the at least one propulsion assembly 1004 may be configured for aerially propelling the UAV 1000 for navigating to at least one delivery location. Further, the UAV 1000 may include at least one compartment defining element 1006 comprised in the body 1002. Further, the at least one compartment defining element 1006 may be configured for defining at least one compartment 1008 in the receptacle 1003. Further, each of the at least one compartment 1008 may include a compartment interior space 1010 and a compartment opening 1012 leading into the compartment interior space 1010. Further, each of the at least one compartment 1008 removably receives each of at least one cargo in the compartment interior space 1010 through the compartment opening 1012 of each of the at least one compartment 1008. Further, the at least one compartment defining element 1006 may include at least one attachment and at least one panel. Further, the at least one attachment may be disposed on an interior surface 1007 of the body 1002 in at least one surface location of the interior surface 1007. Further, the at least one attachment may be configured for attaching the at least one panel in at least one configuration to the interior surface 1007 of the receptacle 1003. Further, the attaching of the at least one panel defines the at least one compartment 1008 in the receptacle 1003. Further, the UAV 1000 may include at least one lid 1014 coupled to the body 1002. Further, each of the at least one lid 1014 corresponds to each of the at least one compartment 1008. Further, each of the at least one lid 1014 may be configured for openably closing the compartment opening 1012 of each of the at least one compartment 1008 by transitioning between a lid open state and a lid closed state. Further, the transitioning of the each of the at least one lid 1014 transitions each of the at least one compartment 1008 between an opened state and a closed state. Further, each of the at least one cargo may be removably received in the compartment interior space 1010 of each of the at least one compartment 1008 in the opened state. Further, each of the at least one lid 1014 restricts the removably receiving of each of the least one cargo from the compartment interior space 1010 of each of the at least one compartment 1008 in the closed state. Further, the UAV 1000 may include at least one locking device 1016 coupled to the at least one lid 1014. Further, each of the at least one locking device 1016 corresponds to each of the at least one lid 1014 corresponding to each of the at least one compartment 1008. Further, each of the at least one locking device 1016 may be configured to be transitioned from a locked state to an unlocked state based on a code. Further, each of the at least one locking device 1016 allows the transitioning of each of the at least one lid 1014 between the lid open state and the lid closed state in the unlocked state. Further, each of the at least one locking device 1016 restricts the transitioning of each of the at least one lid 1014 between the lid open state and the lid closed state in the locked state.

Further, in some embodiments, the at least one attachment may be configured for removably attaching the at least one panel in the at least one configuration to the interior surface 1007 of the receptacle 1003. Further, the removably attaching of the at least one panel defines the at least one compartment 1008 in the receptacle 1003.

Further, in some embodiments, the at least one panel may be configured to be removably attached in the at least one configuration to the interior surface 1007 of the receptacle 1003 using the at least one attachment for the defining of the at least one compartment 1008.

In further embodiments, the UAV 1000 may include a primary lid coupled to the body 1002. Further, the primary lid may be configured for openably closing the receptacle opening 1005 by transitioning between a primary lid open state and a primary lid closed state. Further, the primary lid allows the transitioning of the at least one lid 1014 in the primary lid open state. Further, the primary lid restricts the transitioning of the at least one lid 1014 in the primary lid closed state.

FIG. 11 is a flowchart of a method 1100 for facilitating multiple parcel deliveries at multiple locations using a cargo UAV, in accordance with some embodiments. Further, at 1102, the method 1100 may include a step of receiving, using a communication device, at least one delivery information from at least one consigner device. Further, the at least one delivery information may include a plurality of dispatching locations and a plurality of destination locations. Further, the at least one delivery information may be the at least one delivery data. Further, the at least one consigner device may be associated with at least one consigner of at least one article of a plurality of articles to be delivered using the cargo UAV. Further, at 1104, the method 1100 may include a step of retrieving, using a storage device, a geographical map data. Further, the geographical map data may include geographical information associated with the plurality of dispatching locations and the plurality of destination locations. Further, at 1106, the method 1100 may include a step of comparing, using a processing device, the at least one delivery information and the geographical map data. Further, at 1108, the method 1100 may include a step of generating, using the processing device, at least one optimized route that may connect at least one dispatching location of the plurality of dispatching locations with two or more destination locations of the plurality of destination locations route, based on the comparing. Further, the at least one optimized route may be the at least one route. Further, in some instances, the at least one optimized route may connect the at least one dispatching location with at least one destination location of the plurality of destination locations. Further, in some instances, the at least one optimized route may be based on minimizing the distances between the at least one dispatching location and the two or more destination locations. Further, in an instance, the at least one optimized route may be based on the prioritizing of the two or more destination locations. Further, the UAV may deliver the plurality of articles to the plurality of destination locations in a single trip by following the at least one optimized route.

Figure 12:
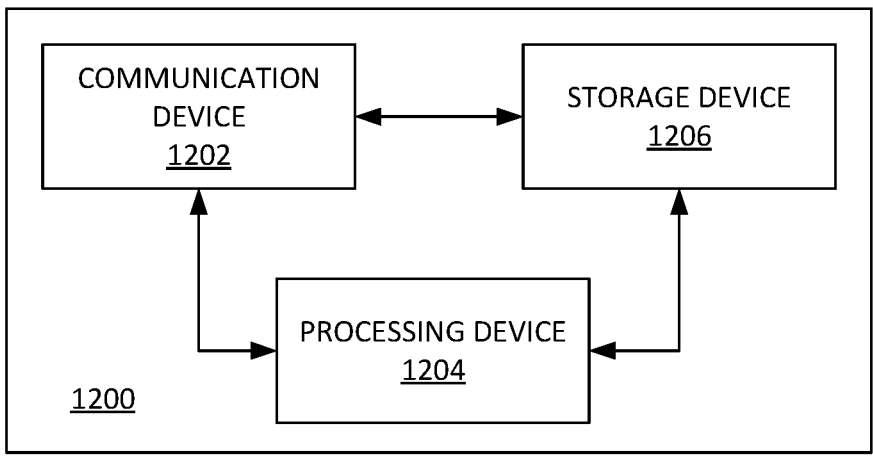
FIG. 12 is a block diagram of a system 1200 for facilitating multiple parcel deliveries at multiple locations using the cargo UAV, in accordance with some embodiments.

FIG. 12 is a block diagram of a system 1200 for facilitating multiple parcel deliveries at multiple locations using the cargo UAV, in accordance with some embodiments. Accordingly, the system 1200 may include a communication device 1202, a processing device 1204, and a storage device 1206. Further, the system 1200 may be a modular cargo management system. Further, the storage device 1206 may be communicatively coupled with the processing device 1204. Further, the storage device 1206 may be communicatively coupled with the communication device 1202. Further, the communication device 1202 may be communicatively coupled with the processing device 1204. Further, the communication device 1202 may be configured for receiving at least one delivery information from at least one consigner device. Further, the at least one delivery information may include a plurality of dispatching locations and a plurality of destination locations. Further, the at least one consigner device may be associated with at least one consigner of at least one article to be delivered using the cargo UAV. Further, the storage device 1206 may be configured for retrieving a geographical map data. Further, the geographical map data may include geographical information associated with the plurality of dispatching locations and the plurality of destination locations. Further, the processing device 1204 may be configured for comparing the at least one delivery information and the geographical map data. Further, the processing device 1204 may be configured for generating at least one optimized route based on the comparing. Further, the at least one optimized route may connect at least one dispatching location of the plurality of dispatching locations with two or more destination locations of the plurality of destination locations. Further, in some instances, the at least one optimized route may connect the at least one dispatching location with at least one destination location of the plurality of destination locations. Further, in some instances, the at least one optimized route may be based on minimizing the distances between the at least one dispatching location and the two or more destination locations. Further, in an instance, the at least one optimized route may be based on the prioritizing of the two or more destination locations. Further, the UAV may deliver the plurality of articles to the plurality of destination locations in a single trip by following the at least one optimized route.

Figure 13:
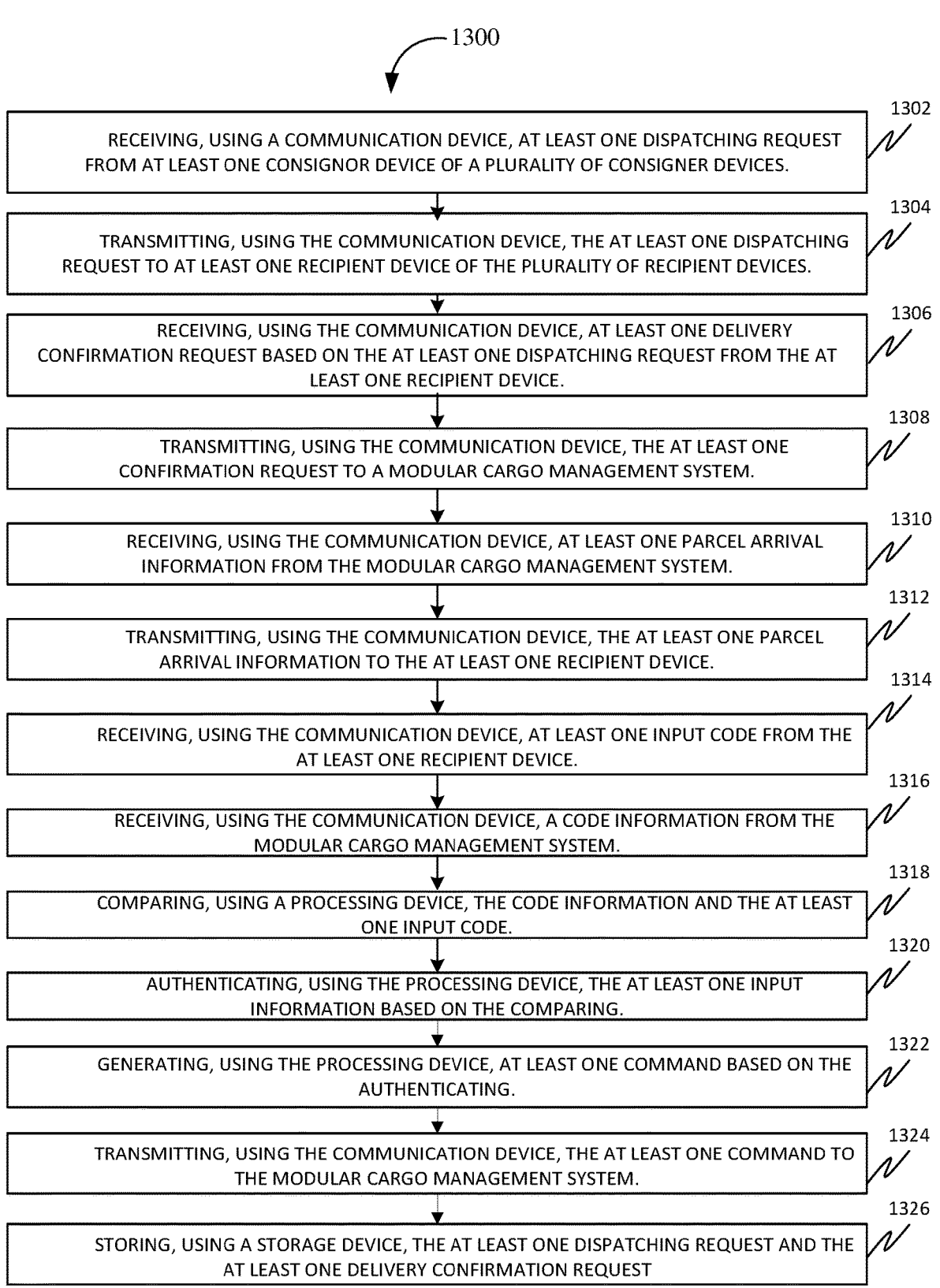
FIG. 13 is a flowchart of a method 1300 for facilitating parcel delivery operation using the cargo UAV, in accordance with some embodiments.

FIG. 13 is a flowchart of a method 1300 for facilitating parcel delivery operation using the cargo UAV, in accordance with some embodiments. Further, at 1302, the method 1300 may include a step of receiving, using a communication device, at least one dispatching request from at least one consigner device of a plurality of consigner devices. Further, the at least one dispatching request may include information associated with at least one article of a plurality of articles to be delivered by the cargo UAV to at least one recipient of a plurality of recipients. Further, the plurality of articles may be the plurality of cargos. Further, the plurality of recipients may be a plurality of users. Further, the at least one consigner device may be associated with at least one consigner of the at least one article. Further, the at least one consigner device may include a smartphone, a laptop, a desktop, etc. Further, in an instance, the at least one consigner may include an e-commerce company, and the at least one recipient may include a buyer of the e-commerce company. Further, at 1304, the method 1300 may include a step of transmitting, using the communication device, the at least one dispatching request to at least one recipient device of a plurality of recipient devices. Further, the at least one recipient device may include the at least one user device. Further, the at least one recipient device may be associated with the at least one recipient. Further, the at least one recipient device may include a smartphone, a laptop, a desktop, etc. Further, at 1306, the method 1300 may include a step of receiving, using the communication device, at least one delivery confirmation request based on the at least one dispatching request from the at least one recipient device. Further, the at least one delivery confirmation request may indicate that the at least one recipient may want the at least one article to be delivered. Further, the at least one delivery confirmation request may include at least one location selected by the at least one recipient, at least one time slot selected by the at least one recipient, etc. Further, at 1308, the method 1300 may include a step of transmitting, using the communication device, the at least one delivery confirmation request to a modular cargo management system. Further, the modular cargo management system may be configured for enabling the cargo UAV to deliver the at least one article to the at least one location selected by the at least one recipient at the at least one time slot selected by the at least one recipient by following at least one optimized route. Further, the at least one optimized route may connect at least one dispatching location of a plurality of dispatching locations with at least one destination location associated with the at least one recipient. Further, the UAV may deliver the plurality of articles to a plurality of destination locations associated with the plurality of recipients in a single trip by following the at least one optimized route. Further, at 1310, the method 1300 may include a step of receiving, using the communication device, at least one parcel arrival information from the modular cargo management system. Further, the at least one parcel arrival information may indicate the arrival of the cargo UAV at the at least one location selected by the at least one recipient within the at least one time slot selected by the at least one recipient. Further, the cargo UAV may be containing the at least one article. Further, at 1312, the method 1300 may include a step of transmitting, using the communication device, the at least one parcel arrival information to the at least one recipient device. Further, at 1314, the method 1300 may include a step of receiving, using the communication device, at least one input code from the at least one recipient device. Further, the at least one input code may include a scanned code associated with the at least one article, an entered password associated with the at least one article, etc. Further, at 1316, the method 1300 may include a step receiving, using the communication device, a code information (such as the code) from the modular cargo management system. Further, the code information may include a plurality of codes associated with a plurality of articles carried by the cargo UAV for delivery. Further, the code information may include an OTP, a QR code, etc. 20 Further, at 1318, the method 1300 may include a step of comparing, using a processing device, the code information and the at least one input code. Further, at 1320, the method 1300 may include a step of authenticating, using the processing device, the at least one input information based on the comparing. Further, at 1322, the method 1300 may include a step of generating, using the processing device, at least one command based on the authenticating. Further, at 1324, the method 1300 may include a step of transmitting, using the communication device, the at least one command to the modular cargo management system. Further, a smart lock may be communicatively coupled with the modular cargo management system. Further, the modular cargo management system may be configured for transmitting the at least one command to the smart lock. Further, the smart lock of the modular cargo management system may be configured for transitioning at least one lid of a plurality of lids associated with at least one compartment of a plurality of compartments in the cargo UAV from a locked state to an unlocked state based on the at least one command. Further, the at least one compartment may be accommodating the at least one article. Further, in the unlocked state, the at least one lid may be opened to uncover the at least one compartment to allow the at least one recipient to pick up the at least one article. Further, in the locked state, the smart lock may lock the at least one lid to prevent any unapproved access to the at least one compartment. Further, at 1326, the method 1300 may include a step of storing, using a storage device, the at least one dispatching request and the at least one delivery confirmation request.

Figure 14:
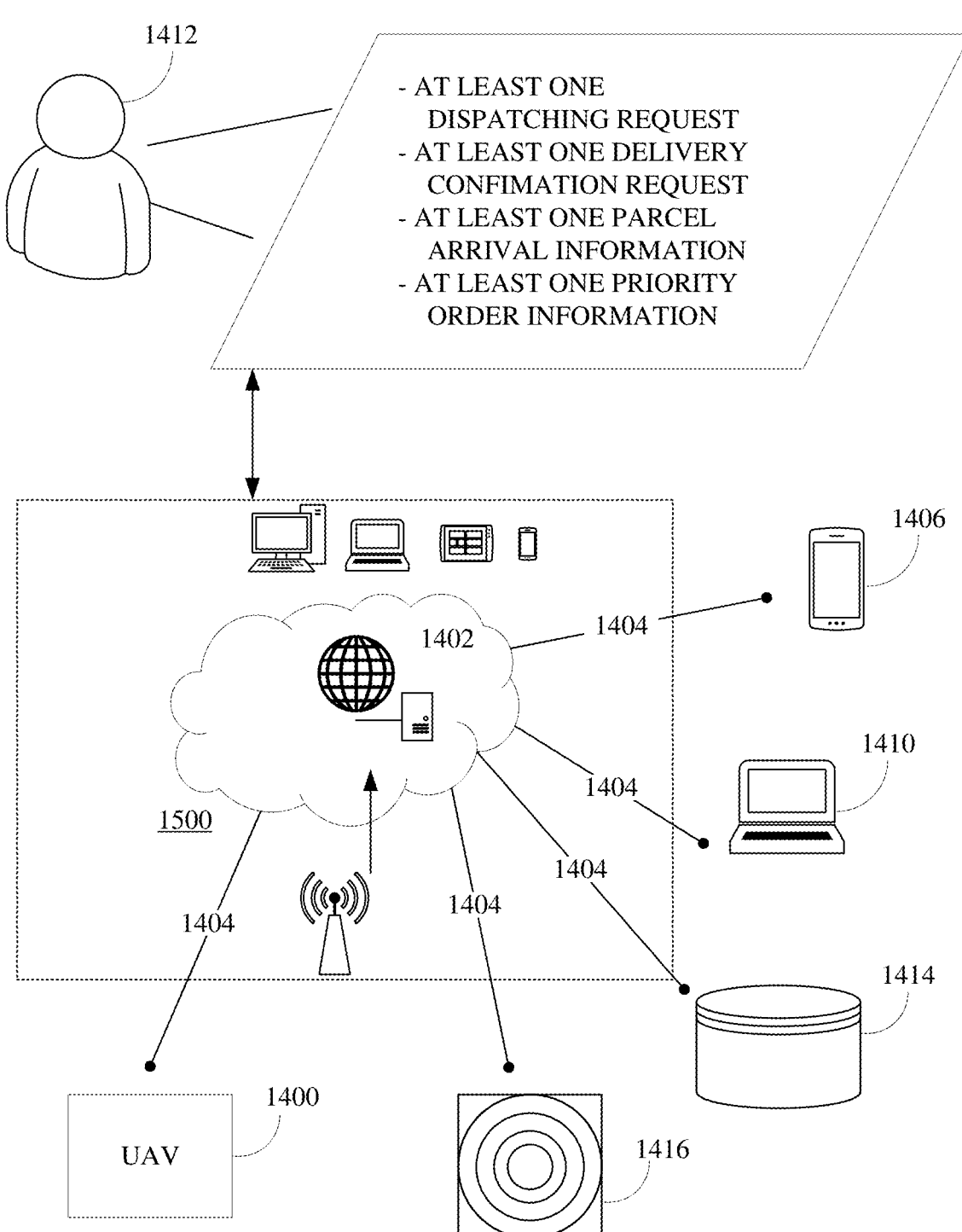
FIG. 14 is an illustration of an online platform consistent with various embodiments of the present disclosure.

FIG. 14 is an illustration of an online platform 1400 consistent with various embodiments of the present disclosure. By way of non-limiting example, the online platform 1400 for facilitating parcel delivery operation using the UAV may be hosted on a centralized server 1402, such as, for example, a cloud computing service. The centralized server 1402 may communicate with other network entities, such as, for example, a mobile device 1406 (such as a smartphone, a laptop, a tablet computer, etc.), other electronic devices 1410 (such as desktop computers, server computers, etc.), databases 1414, sensors 1416, and an unmanned aerial vehicle (UAV) 1400 (such as the UAV 100) over a communication network 1404, such as, but not limited to, the Internet. Further, users of the online platform 1400 may include relevant parties such as, but not limited to, end-users, administrators, service providers, service consumers, and so on. Accordingly, in some instances, electronic devices operated by the one or more relevant parties may be in communication with the platform.

A user 1412, such as the one or more relevant parties, may access online platform 1400 through a web based software application or browser. The web based software application may be embodied as, for example, but not be limited to, a website, a web application, a desktop application, and a mobile application compatible with a computing device 1500.

Figure 15:
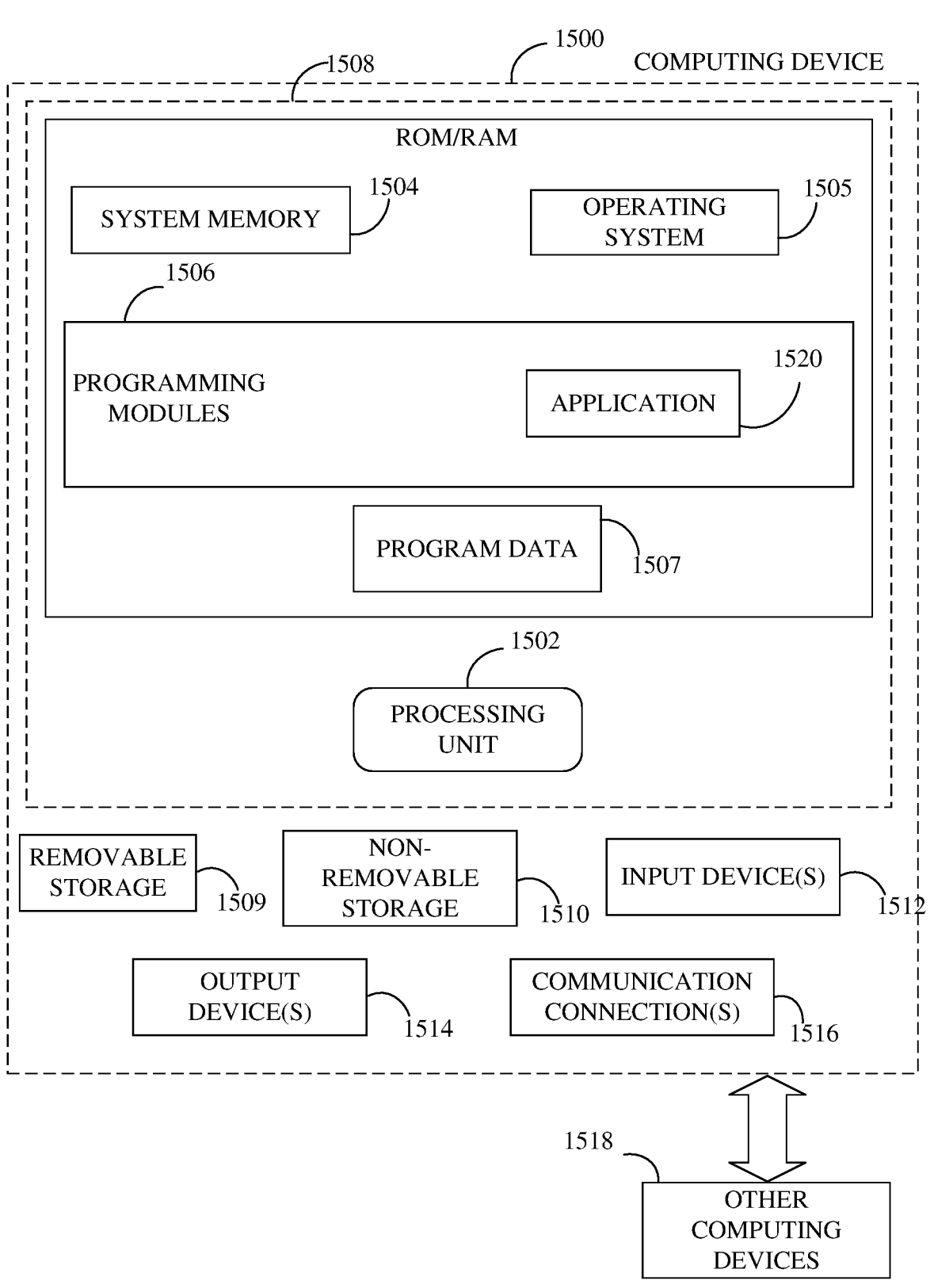
FIG. 15 is a block diagram of a computing device for implementing the methods disclosed herein, in accordance with some embodiments.

With reference to FIG. 15, a system consistent with an embodiment of the disclosure may include a computing device or cloud service, such as computing device 1500. In a basic configuration, computing device 1500 may include at least one processing unit 1502 and a system memory 1504. Depending on the configuration and type of computing device, system memory 1504 may comprise, but is not limited to, volatile (e.g. random-access memory (RAM)), non-volatile (e.g. read-only memory (ROM)), flash memory, or any combination. System memory 1504 may include operating system 1505, one or more programming modules 1506, and may include a program data 1507. Operating system 1505, for example, may be suitable for controlling computing device 1500's operation. In one embodiment, programming modules 1506 may include image-processing module, machine learning module. Furthermore, embodiments of the disclosure may be practiced in conjunction with a graphics library, other operating systems, or any other application program and is not limited to any particular application or system. This basic configuration is illustrated in FIG. 15 by those components within a dashed line 1508.

Computing device 1500 may have additional features or functionality. For example, computing device 1500 may also include additional data storage devices (removable and/or non-removable) such as, for example, magnetic disks, optical disks, or tape. Such additional storage is illustrated in FIG. 15 by a removable storage 1509 and a non-removable storage 1510. Computer storage media may include volatile and non-volatile, removable and non-removable media implemented in any method or technology for storage of information, such as computer-readable instructions, data structures, program modules, or other data. System memory 1504, removable storage 1509, and non-removable storage 1510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1500. Any such computer storage media may be part of device 1500. Computing device 1500 may also have input device(s) 1512 such as a keyboard, a mouse, a pen, a sound input device, a touch input device, a location sensor, a camera, a biometric sensor, etc. Output device(s) 1514 such as a display, speakers, a printer, etc. may also be included. The aforementioned devices are examples and others may be used.

Computing device 1500 may also contain a communication connection 1516 that may allow device 1500 to communicate with other computing devices 1518, such as over a network in a distributed computing environment, for example, an intranet or the Internet. Communication connection 1516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1504, including operating system 1505. While executing on processing unit 1502, programming modules 1506 (e.g., application 1520 such as a media player) may perform processes including, for example, one or more stages of methods, algorithms, systems, applications, servers, databases as described above. The aforementioned process is an example, and processing unit 1502 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. An unmanned aerial vehicle (UAV) for facilitating aerial deliveries of cargo, the UAV comprising:

a body defining a receptacle with a receptacle opening within the body;

at least one propulsion assembly attached to the body, wherein the at least one propulsion assembly is configured for aerially propelling the UAV;

at least one compartment defining element comprised in the body, wherein the at least one compartment defining element is configured for defining at least one compartment in the receptacle, wherein each of the at least one compartment removably receives each of at least one cargo, wherein the defining of the at least one compartment in the receptacle comprises defining the at least one compartment with at least one compartment characteristic, wherein the at least one compartment characteristic comprises at least one of a shape, a size, and a volume of the at least one compartment;

at least one lid coupled to the body, wherein each of the at least one lid corresponds to each of the at least one compartment, wherein each of the least one lid is configured for openably closing each of the at least one compartment by transitioning between a lid open state and a lid closed state, wherein the transitioning of the each of the at least one lid transitions each of the at least one compartment between an opened state and a closed state, wherein each of the at least one cargo is removably received in each of the at least one compartment in the opened state, wherein each of the at least one lid restricts the removably receiving of each of the least one cargo from each of the at least one compartment in the closed state; and at least one locking device coupled to the at least one lid, wherein each of the at least one locking device corresponds to each of the at least one lid corresponding to each of the at least one compartment, wherein each of the at least one locking device is configured for transitioning from a locked state to an unlocked state, wherein each of the at least one locking device allows the transitioning of each of the at least one lid between the lid open state and the lid closed state in the unlocked state, wherein each of the at least one locking device restricts the transitioning of each of the at least one lid between the lid open state and the lid closed state in the locked state.

2. The UAV of claim 1, wherein each of the at least one compartment comprises a compartment interior space and a compartment opening leading into the compartment interior space, wherein the compartment interior space and the compartment opening of each of the at least one compartment is based on the at least one compartment characteristic.

3. The UAV of claim 1, wherein the at least one compartment defining element comprises at least one attachment, wherein the at least one attachment is disposed on an interior surface of the receptacle in at least one surface location of the interior surface, wherein the at least one attachment is configured for attaching at least one panel in at least one configuration to the interior surface of the receptacle, wherein the at least one configuration comprises at least one of an orientation and a position of the at least one panel in the receptacle, wherein the attaching of the at least one panel defines the at least one compartment in the receptacle.

4. The UAV of claim 3, wherein the at least one attachment is configured for removably attaching the at least one panel in the at least one configuration to the interior surface of the receptacle, wherein the removably attaching of the at least one panel defines the at least one compartment in the receptacle.

5. The UAV of claim 3, wherein the at least one compartment defining element further comprises the at least one panel, wherein the at least one panel is configured for attaching in the at least one configuration to the interior surface of the receptacle using the at least one attachment disposed on the interior surface for the defining of the at least one compartment.

6. The UAV of claim 5, wherein the at least one panel is configured for removably attaching in the at least one configuration to the interior surface of the receptacle using the at least one attachment for the defining of the at least one compartment.

7. The UAV of claim 1 further comprising a primary lid coupled to the body, wherein the primary lid is configured for openably closing the receptacle opening by transitioning between a primary lid open state and a primary lid closed state, wherein the primary lid allows the transitioning of the at least one lid in the primary lid open state, wherein the primary lid restricts the transitioning of the at least one lid in the primary lid closed state.

8. The UAV of claim 1 further comprising:
a communication device comprised in the body, wherein the communication device is configured for receiving at least one delivery data from at least one device, wherein the at least one delivery data comprises at least one delivery location for delivering the at least one cargo; and
a processing device comprised in the body, wherein the processing device is communicatively coupled with the communication device, wherein the processing device is configured for:
analyzing the at least one delivery data; and
generating at least one propelling instruction for the at least one propulsion assembly for the aerially propelling of the UAV to the at least one delivery location for delivering of the at least one cargo based on the analyzing, wherein the processing device is communicatively coupled with the at least one propulsion assembly, wherein the aerially propelling of the UAV to the at least one delivery location is further based on the at least one propelling instruction.

9. The UAV of claim 8 further comprising:
at least one sensor comprised in the body, wherein the at least one sensor is communicatively coupled with the processing device, wherein the at least one sensor is further configured for generating at least one location data associated with a current location of the UAV, wherein the processing device is further configured for:
analyzing the at least one location data; and
determining at least one route to navigate to the at least one delivery location from the current location based on the analyzing of the at least one location data and the analyzing of the at least one delivery data, wherein the generating of the at least one propelling instruction is further based on the at least one route.

10. The UAV of claim 8, wherein the communication device is further configured for receiving at least one priority order information from at least one first device, wherein the at least one priority order information comprises a prioritizing order of each of the at least one cargo, wherein the processing device is further configured for:
analyzing the at least one priority order information; and
generating at least one route for the delivering of each of the at least one cargo in the prioritizing order based on the analyzing of the at least one priority order information and the analyzing of the at least one delivery data, wherein the generating of the at least one propelling instruction is further based on the at least one route.

11. The UAV of claim 1, wherein the defining of the at least one compartment comprises defining a plurality of compartments in the receptacle, wherein each of the plurality of compartments comprises a compartment interior space and a compartment opening leading into the compartment interior space, wherein the at least one cargo comprises a plurality of cargos, wherein each of the plurality of compartments removably receives each of the plurality of cargos in the compartment interior space through the compartment opening of each of the plurality of compartments.

12. The UAV of claim 1, wherein the transitioning from the locked state to the unlocked state is based on a code, wherein each of the at least one locking device is associated with an assigned code, wherein each of the at least one locking device is configured for:
obtaining the code through an input device from each of at least one user associated with each of the at least one cargo;
comparing the assigned code with the code; and
authenticating each of the at least one user based on the comparing, wherein the transitioning of each of the at least one locking device from the locked state to the unlocked state is further based on the authenticating.

13. An unmanned aerial vehicle (UAV) for facilitating aerial deliveries of cargo, the UAV comprising:
a body defining a receptacle with a receptacle opening within the body;
at least one propulsion assembly attached to the body, wherein the at least one propulsion assembly is configured for aerially propelling the UAV;
at least one compartment defining element comprised in the body, wherein the at least one compartment defining element is configured for defining at least one compartment in the receptacle, wherein each of the at least one compartment removably receives each of at least one cargo, wherein the defining of the at least one compartment in the receptacle comprises defining the at least one compartment with at least one compartment characteristic, wherein the at least one compartment characteristic comprises at least one of a shape, a size, and a volume of the at least one compartment;

at least one lid coupled to the body, wherein each of the at least one lid corresponds to each of the at least one compartment, wherein each of the least one lid is configured for openably closing each of the at least one compartment by transitioning between a lid open state and a lid closed state, wherein the transitioning of the each of the at least one lid transitions each of the at least one compartment between an opened state and a closed state, wherein each of the at least one cargo is removably received in each of the at least one compartment in the opened state, wherein each of the at least one lid restricts the removably receiving of each of the least one cargo from each of the at least one compartment in the closed state;

at least one locking device coupled to the at least one lid, wherein each of the at least one locking device corresponds to each of the at least one lid corresponding to each of the at least one compartment, wherein each of the at least one locking device is configured for transitioning from a locked state to an unlocked state, wherein each of the at least one locking device allows the transitioning of each of the at least one lid between the lid open state and the lid closed state in the unlocked state, wherein each of the at least one locking device restricts the transitioning of each of the at least one lid between the lid open state and the lid closed state in the locked state;

a communication device comprised in the body, wherein the communication device is configured for receiving at least one delivery data from at least one device, wherein the at least one delivery data comprises at least one delivery location for delivering the at least one cargo; and a processing device comprised in the body, wherein the processing device is communicatively coupled with the communication device, wherein the processing device is configured for:

analyzing the at least one delivery data; and generating at least one propelling instruction for the at least one propulsion assembly for the aerially propelling of the UAV to the at least one delivery location for delivering of the at least one cargo based on the analyzing, wherein the processing device is communicatively coupled with the at least one propulsion assembly, wherein the aerially propelling of the UAV to the at least one delivery location is further based on the at least one propelling instruction.

14. The UAV of claim 13 further comprising:

at least one sensor comprised in the body, wherein the at least one sensor is communicatively coupled with the processing device, wherein the at least one sensor is further configured for generating at least one location data associated with a current location of the UAV, wherein the processing device is further configured for:

analyzing the at least one location data; and determining at least one route to navigate to the at least one delivery location from the current location based on the analyzing of the at least one location data and the analyzing of the at least one delivery data, wherein the generating of the at least one propelling instruction is further based on the at least one route.

15. The UAV of claim 13, wherein the communication device is further configured for receiving at least one priority order information from at least one first device, wherein the at least one priority order information comprises a prioritizing order of each of the at least one cargo, wherein the processing device is further configured for:

analyzing the at least one priority order information; and generating at least one route for the delivering of each of the at least one cargo in the prioritizing order based on the analyzing of the at least one priority order information and the analyzing of the at least one delivery data, wherein the generating of the at least one propelling instruction is further based on the at least one route.

16. The UAV of claim 13, wherein the transitioning from the locked state to the unlocked state is based on a code, wherein each of the at least one locking device is associated with an assigned code, wherein each of the at least one locking device is configured for:

obtaining the code through an input device from each of at least one user associated with each of the at least one cargo;

comparing the assigned code with the code; and authenticating each of the at least one user based on the comparing, wherein the transitioning of each of the at least one locking device from the locked state to the unlocked state is further based on the authenticating.

17. An unmanned aerial vehicle (UAV) for facilitating aerial deliveries of cargo, the UAV comprising:

a body defining a receptacle with a receptacle opening within the body;

at least one propulsion assembly attached to the body, wherein the at least one propulsion assembly is configured for aerially propelling the UAV;

at least one compartment defining element comprised in the body, wherein the at least one compartment defining element is configured for defining at least one compartment in the receptacle, wherein each of the at least one compartment removably receives each of at least one cargo, wherein the defining of the at least one compartment in the receptacle comprises defining the at least one compartment with at least one compartment characteristic, wherein the at least one compartment characteristic comprises at least one of a shape, a size, and a volume of the at least one compartment, wherein the at least one compartment defining element comprises at least one attachment and at least one panel, wherein the at least one attachment is disposed on an interior surface of the receptacle in at least one surface location of the interior surface, wherein the at least one attachment is configured for attaching the at least one panel in at least one configuration to the interior surface of the receptacle, wherein the attaching of the at least one panel defines the at least one compartment in the receptacle;

at least one lid coupled to the body, wherein each of the at least one lid corresponds to each of the at least one compartment, wherein each of the least one lid is configured for openably closing each of the at least one compartment by transitioning between a lid open state and a lid closed state, wherein the transitioning of the each of the at least one lid transitions each of the at least one compartment between an opened state and a closed state, wherein each of the at least one cargo is removably received in each of the at least one compartment in the opened state, wherein each of the at least one lid restricts the removably receiving of each of the least one cargo from each of the at least one compartment in the closed state; and at least one locking device coupled to the at least one lid, wherein each of the at least one locking device corresponds to each of the at least one lid corresponding to each of the at least one compartment, wherein each of the at least one locking device is configured for transitioning from a locked state to an unlocked state, wherein each of the at least one locking device allows the transitioning of each of the at least one lid between the lid open state and the lid closed state in the unlocked state, wherein each of the at least one locking device restricts the transitioning of each of the at least one lid between the lid open state and the lid closed state in the locked state.

18. The UAV of claim 17, wherein the at least one attachment is configured for removably attaching the at least one panel in the at least one configuration to the interior surface of the receptacle, wherein the removably attaching of the at least one panel defines the at least one compartment in the receptacle.

19. The UAV of claim 17, wherein the at least one panel is configured for removably attaching in the at least one configuration to the interior surface of the receptacle using the at least one attachment for the defining of the at least one compartment.

20. The UAV of claim 17 further comprising a primary lid coupled to the body, wherein the primary lid is configured for openably closing the receptacle opening by transitioning between a primary lid open state and a primary lid closed state, wherein the primary lid allows the transitioning of the at least one lid in the primary lid open state, wherein the primary lid restricts the transitioning of the at least one lid in the primary lid closed state.

* * * * *